United States Patent
Craske et al.

(10) Patent No.: US 9,940,268 B2
(45) Date of Patent: Apr. 10, 2018

(54) HANDLING MEMORY ACCESS PROTECTION AND ADDRESS TRANSLATION IN A DATA PROCESSING APPARATUS

(71) Applicant: ARM LIMITED, Cambridge (GB)

(72) Inventors: Simon John Craske, Cambridge (GB); Richard Roy Grisenthwaite, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/762,976

(22) PCT Filed: Feb. 5, 2013

(86) PCT No.: PCT/GB2013/050256
§ 371 (c)(1),
(2) Date: Jul. 23, 2015

(87) PCT Pub. No.: WO2014/122414
PCT Pub. Date: Aug. 14, 2014

(65) Prior Publication Data
US 2015/0356029 A1    Dec. 10, 2015

(51) Int. Cl.
*G06F 12/14* (2006.01)
*G06F 12/1009* (2016.01)
*G06F 12/1027* (2016.01)

(52) U.S. Cl.
CPC ...... *G06F 12/1458* (2013.01); *G06F 12/1009* (2013.01); *G06F 12/1441* (2013.01);
(Continued)

(58) Field of Classification Search
CPC ...... G06F 12/10; G06F 12/1027; G06F 12/14; G06F 12/1416; G06F 12/145
(Continued)

(56) References Cited

U.S. PATENT DOCUMENTS

2004/0177261 A1* 9/2004 Watt et al. ............. 713/193
2004/0243823 A1    12/2004 Moyer et al.
(Continued)

FOREIGN PATENT DOCUMENTS

JP    H02-105240    4/1990
JP    H03-139746    6/1991
(Continued)

OTHER PUBLICATIONS

International Search Report for PCT/GB2013/050256, dated Nov. 11, 2013, 3 pages.
(Continued)

*Primary Examiner* — Than Nguyen
(74) *Attorney, Agent, or Firm* — Nixon & Vanderhye P.C.

(57) ABSTRACT

A processing apparatus has a memory protection unit (MPU) 38 and an address translation unit (ATU) 120 which operate concurrently for memory access operations performed by processing circuitry 22. The MPU 38 stores access permission data for corresponding regions of an address space. The ATU 120 stores address translation entries for defining virtual-to-physical mappings for corresponding pages of the address space. In response to a memory access operation specifying a target address, one of the MPU 38 and the ATU 120 is selected to handle the memory access operation based on the target address. If the MPU 38 is selected then the target address is a physical address and the MPU 38 checks access permissions using a corresponding set of permission data. If the ATU 120 is selected then the target address is a virtual address and is translated into a physical address using a corresponding translation entry.

22 Claims, 13 Drawing Sheets

(52) U.S. Cl.
CPC ...... *G06F 12/1475* (2013.01); *G06F 12/1027* (2013.01); *G06F 12/145* (2013.01); *G06F 12/1416* (2013.01); *G06F 2212/1052* (2013.01); *G06F 2212/152* (2013.01); *G06F 2212/651* (2013.01)

(58) Field of Classification Search
USPC .......................................... 711/163, 202, 203
See application file for complete search history.

(56) References Cited

U.S. PATENT DOCUMENTS

| | | | |
|---|---|---|---|
| 2007/0168643 A1* | 7/2007 | Hummel et al. | 711/207 |
| 2007/0168644 A1* | 7/2007 | Hummel et al. | 711/207 |
| 2009/0216963 A1 | 8/2009 | Greiner et al. | |
| 2010/0095085 A1* | 4/2010 | Hummel et al. | 711/207 |

FOREIGN PATENT DOCUMENTS

| | | |
|---|---|---|
| JP | H08-320829 | 12/1996 |
| JP | 2004-38553 | 2/2004 |
| JP | 2005-102144 | 4/2005 |
| JP | 2006-506754 | 2/2006 |

OTHER PUBLICATIONS

Written Opinion of the ISA for PCT/GB2013/050256, dated Nov. 11, 2013, 4 pages.
International Preliminary Report on Patentability dated Aug. 20, 2015 in PCT/GB2013/050256, 6 pages.
Translation of Japanese Office Action dated Dec. 13, 2016 in JP 2015-555782, 4 pages.

* cited by examiner

HANDLING MEMORY ACCESS PROTECTION AND ADDRESS TRANSLATION IN A DATA PROCESSING APPARATUS

This application is the U.S. national phase of International Application No. PCT/GB2013/050256 filed 5 Feb. 2013, which designated the U.S. the entire contents of which is hereby incorporated by reference.

The present invention relates to the field of data processing. More particularly, the invention relates to handling memory access operations in a data processing apparatus.

It is known to provide data processing systems with memory protection units (MPUs) for controlling access to memory by programs executing on the system. Memory protection units receive a physical address and determine in accordance with a set of access permissions whether or not a memory access operation is permitted. Memory protection units are well suited for use within real time systems (for example, processors used in automotive or industrial applications), where it is often desirable to have deterministic behavior with respect to how long particular processing operations will take to complete. There is an increasing need to combine many different software applications, which previously would have been executed by separate processors, in a single processor. The present technique seeks to improve the ability of a processor having a memory protection unit to handle many software applications.

Viewed from one aspect the present invention provides a data processing apparatus comprising:

processing circuitry configured to perform memory access operations for accessing data from a memory;

a memory protection unit configured to store sets of permission data for defining access permissions for corresponding regions of a memory address space; and an address translation unit configured to store address translation entries for defining virtual-to-physical address mappings for corresponding pages of the memory address space; wherein:

in response to a memory access operation specifying a target address, said data processing apparatus is configured to select, in dependence on said target address, which of said memory protection unit and said address translation unit to use for handling said memory access operation;

if said memory protection unit is selected for handling said memory access operation, then said memory protection unit is configured to determine whether said memory access operation is permitted using a corresponding set of permission data corresponding to a region including said target address, and if said memory access operation is permitted, to allow further processing of said memory access operation using said target address as a physical address; and if said address translation unit is selected for handling said memory access operation, then said address translation unit is configured to translate said target address from a virtual address to a physical address for said memory access operation using a corresponding address translation entry corresponding to a page including said target address.

With the increasing demand for combining multiple pieces of software on a single processor, there is an increasing likelihood that legacy software which has been compiled in a non-position-independent manner is present, so that there may be multiple incompatible pieces of software which refer to the same address range of the memory address space. In a system comprising only a memory protection unit, this would cause a problem as the memory protection unit is incapable of translating addresses to avoid such conflicts. On the other hand, virtual addressing using an address translation unit would typically be regarded as unsuitable for use in a real time system since the address translation unit would usually be expected to provide non-deterministic response time. Previously, a memory protection unit and translation of virtual addresses to physical addresses have been regarded as incompatible and mutually exclusive, since memory protection units would operate using physical addresses and the translation unit would operate using virtual addresses.

Counter-intuitively the present technique recognises that the memory protection unit and address translation unit can operate together, with the memory protection unit enabling quick and deterministic response times for memory accesses, which is important in safety-critical real time applications, and the address translation unit supporting the execution of relocated code in the real time system. The memory protection unit and address translation unit are active concurrently with some memory accesses being handled by the memory protection unit and other memory accesses being handled by the address translation unit. Which unit is used to handle a particular memory access operation is selected based on the target address. The target address can be interpreted either as a physical address if the memory protection unit is selected, or as a virtual address if the address translation unit is selected. If the memory protection unit is selected, then the target address is mapped directly to the physical address specifying the required location in memory, and the physical address can then be used for further processing of the memory access operation, such as issuing the access to the memory or providing further access control with another memory protection unit. For accesses for which the address translation unit is selected, the target address is translated into a physical address identifying the required memory location to support relocation of code in the address space. Hence, the address space as seen by the processor is interpreted as a mixture of physical addresses and virtual addresses depending on which of the memory protection unit and address translation unit is used for a given target address.

The address translation entries of the address translation unit may be directly programmable by software executed by the processing circuitry. In particular, updating of the address translation entries may be controlled by the software independently of whether, in response to memory access operation, the address translation unit is determined to contain a corresponding address translation entry. This is different to a standard translation lookaside buffer (TLB) which typically has page walking circuitry for populating the entries of the translation lookaside buffer if no corresponding entry is found in the TLB. However, as a page walking operation can require several levels of page tables in memory to be traversed in order to locate a page table entry for a given target address, page table walking causes response times for memory accesses to be variable, which would be inappropriate for a real time system. This is why address translation would typically be regarded as unsuitable for the real time system. To address this problem, the address translation unit of the present technique does not have page table walking circuitry and updating of the translation entries is instead performed directly by software. This ensures that there is a predictable response time for accesses handled using the address translation unit. The address translation unit can maintain a reasonably constant set of translation entries for handling a limited number of address translations for making pieces of legacy software which reference conflicting addresses compatible with each other.

Similarly, the memory protection unit may also be programmable by software executed by the processing circuitry.

The selection of which unit to use for a given memory access operation can be made in different ways. In one example, the apparatus may comprise a selection unit which selects, based on the target address, which of the address translation unit and memory protection unit should handle the memory access operation. For example, the selection unit may store selection entries for different address ranges, each selection entry indicating which of the memory protection unit and address translation unit should be used for the corresponding address range. The selection entries may be programmed in advance so that the programmer can directly specify the partitioning of the address space into memory protection regions and address translation regions. Alternatively, the programmer could merely program the data within the memory protection unit and address translation unit, and then the selection entries could be populated dynamically during operation of the system to indicate which unit was found to contain the data corresponding to a particular address range, so that this data can be used to speed up processing on a subsequent memory access for the same address range.

Alternatively, no selection unit could be provided, and instead the memory protection unit and address translation unit may carry out the selection of which unit to use for a given memory access operation. In response to a memory access operation, the memory protection unit may perform a protection lookup to search for a corresponding set of permission data for the target address, and the translation unit may perform a translation lookup to search for an address translation entry corresponding to the target address. If the memory protection unit identifies a corresponding set of permission data, then the memory protection unit can be selected, while if the address translation unit identifies a corresponding address translation entry then the address translation unit can be selected. This avoids the need to store separate selection data specifying which unit to use. The sets of permission data and the address translation entries identify corresponding regions and pages of the memory address space and so can be used to determine which unit should process the memory access operation.

However, performing the lookup operation for all the sets of permission data in the memory protection unit could be costly in terms of performance and energy. Since memory accesses tend to be localized, it is likely that certain ranges of target addresses could be specified by multiple memory access operations in a short space of time. To speed up the lookup, the apparatus may have a memory protection cache which stores a subset of the sets of permission data from the memory protection unit. For example, the subset may comprise the most recently used sets of permission data. In response to a memory access operation, if the memory protection cache stores the corresponding set of permission data then the memory protection unit can be selected for handling the memory access operation, and the memory access operation can be processed without requiring a full protection lookup for all the entries in the memory protection unit, saving time and power.

In a similar way, an address translation cache may be provided to speed up the translation lookup operation. The population of the memory protection cache and address translation cache may be performed using any kind of cache linefill and eviction policy, in a similar way to the allocation of data to a data cache. For example, if a required set of permission data or address translation entry is not present in the corresponding cache, then on identifying the corresponding data in the memory protection unit or address translation unit, the obtained data can be allocated to the corresponding cache to replace a least recently used cache entry.

The protection lookup and the translation lookup may be performed in parallel, so that the two kinds of lookup are independent of one another and are both performed for all accesses. This provides improved response times for memory accesses.

Alternatively, the address translation unit may perform the translation lookup after the memory protection unit has performed the protection lookup. This can be useful because, for example, if the memory protection unit determines from its corresponding set of permission data that the memory access operation is not permitted, then the translation lookup can be omitted to save energy.

One issue arising from performing both a protection lookup in the memory protection unit and a translation lookup in the address translation unit for the same memory access is that the target address could potentially correspond to entries in both units. In a real time system, which may be safety-critical, this could be a problem because if both units attempt to process the memory access then the subsequent processing of the memory access could be uncertain. For example, the memory protection unit could allow the memory access to proceed using the target address as a physical address, while the address translation unit could translate the target address from a virtual address into a different physical address, causing accesses to two different memory locations in response to the same memory request, which could cause indeterminate behaviour.

To prevent such conditions, the apparatus may comprise fault generating circuitry which generates a fault condition if the target address hits in both the memory protection unit and the address translation unit. Simultaneous hits in both units are regarded as programming errors by the system designer and should be discouraged. Effectively, the memory address space as seen by the processing circuitry is divided into some address ranges which correspond to virtual addresses to be translated by the address translation unit and other ranges corresponding to the memory protection unit which represent physical addresses to be processed directly by the memory protection unit. The fault condition may be handled in various ways, depending on the choice of the system designer. For example, an error flag may be issued, the memory access may be halted, or some other exception event may occur, to bring the fault to the attention of the system tester so that the memory protection unit or address translation unit can be reprogrammed to avoid the overlap in the address ranges handled by each unit.

In one example, the memory protection unit and address translation unit may each generate a hit signal indicating whether the target address has matched against one of the entries in the corresponding unit. The fault generating circuitry may generate the fault condition if both the memory protection hit signal and the address translation hit signal indicate a matching entry for the target address.

Although generally a fault condition will be generated if there are multiple hits in the memory protection unit and the address translation unit, there may be situations where such a fault condition may be suppressed. For example, if the memory protection unit determines using the obtained set of permission data that the memory access operation is not permitted, then the fault could be suppressed since in this case the memory access operation will not be performed anyway and so there would be no risk of uncertain behaviour if the access proceeds using the address translation unit.

One example when this would be useful is where the memory protection unit defines multiple sets of access permissions for memory access operations of different privilege levels. A typical use of the permission data in the memory protection unit is to prevent access operations of a first privilege level accessing data associated with a second privilege level. For example, application code at the first privilege level may be prohibited from accessing data used by an operating system at the second privilege level. However, the application code may have been written to refer to addresses in the range reserved for the operating system at the second privilege level. In this case, the address translation unit can be used to translate the addresses used by memory accesses of the first privilege level so that they do not conflict with the range of addresses reserved for the second privilege level. By suppressing generation of the fault condition if hits in both the memory protection unit and address translation unit are detected, but the memory protection unit determines using the obtained set of permission data that the memory access operation for the first privilege level is not permitted, the address translation unit becomes available for the application code to avoid the conflict with the operating system, and the access can proceed without a fault.

Another situation in which a fault may be generated is when the memory protection unit performs the protection lookup and determines that the target address corresponds to multiple sets of permission data which correspond to overlapping regions of the memory address space. Previous memory protection units allowed overlapping regions of the memory address space to be defined, with a priority scheme used to determine which of the overlapping regions should have its access permissions applied to a given memory access. However, this makes the memory protection unit more complex and can cause different response times for different memory accesses and an increased circuit complexity. To reduce the circuit complexity it is simpler to prohibit overlapping regions by generating a fault if a target address hits in multiple regions defined by the memory protection unit. Similarly, a fault could also be generated if the target address matches multiple translation entries in the address translation unit. The fault detected when a target address matches multiple entries within the same unit can be detected from hit signals generated for each entry indicating whether the target address matches the corresponding region or page of the address space.

The memory protection unit can be programmable by software in different ways. A first memory protection interface may be provided which comprises multiple sets of update storage locations, each set of update storage locations corresponding to one of the sets of permission data stored in the memory protection unit. To update a selected set of permission data, software executed by the processor writes updated permission data to the set of update storage locations which corresponds to the selected set of permission data. This kind of interface is useful for a real time operating system since each set of permission data can be updated using an independent set of storage locations and so there is no need to ensure that the memory protection unit has obtained the data from one set of update storage locations before writing to another set of update storage locations.

Also, a second memory protection interface may be provided which comprises an identifier storage location and a set of update storage locations. To update a selected set of permission data in the memory protection unit using the second interface, software executed by the processing circuitry writes an identifier of the selected set of permission data to the identifier storage location and writes updated permission data to the update storage locations. The interface is less efficient for real time systems because to update several sets of permission data, the software must wait for the memory protection unit to obtain one set of permission data from the update storage locations before writing the following set of permission data to the update storage locations. For example, barrier operations can be used to separate the updates of the different sets of permission data. While the first memory protection interface is preferable for a real time system, some legacy software may have been written for use with the second memory protection interface and so to ensure compatibility with such software the system may comprise both the first memory protection interface and the second memory protection interface. In the first and second memory protection interfaces, the update storage locations may be registers or sub-portions of a register, for example.

The memory protection unit which operates in conjunction with the address translation unit may not be the only memory protection unit. There may also be a further memory protection unit which stores sets of further permission data for defining access permissions for corresponding regions of the memory address space. If the memory protection unit determines a match with the target address for a memory access operation, then the memory access operation may be permitted only if both the memory protection unit and the further memory protection unit determine that the memory access operation is permitted. On the other hand, if the translation lookup determines a matching address translation entry for the target address of a memory access operation, then the further memory protection unit may control whether the memory access operation is permitted using further permission data corresponding to the physical address obtained by the address translation unit by translating the target address. Providing a further memory protection unit can be useful for virtualization of the real time processing system, for example with the memory protection unit being used for controlling access permissions set by software executed by the processing circuitry at a first privilege level (e.g. operating system software) and the further memory protection unit being used to control access permissions set by software executed by the processing circuitry at a second privilege level (e.g. hypervisor software).

Viewed from another aspect, the present invention provides a data processing apparatus comprising:

processing means for performing memory access operations for accessing data from a memory means for storing data;

memory protection means for storing sets of permission data for defining access permissions for corresponding regions of a memory address space; and address translation means for storing address translation entries for defining virtual-to-physical address mappings for corresponding pages of the memory address space; wherein:

in response to a memory access operation specifying a target address, said data processing apparatus is configured to select, in dependence on said target address, which of said memory protection means and said address translation means to use for handling said memory access operation;

if said memory protection means is selected for handling said memory access operation, then said memory protection means is configured to determine whether said memory access operation is permitted using a corresponding set of permission data corresponding to a region including said target address, and if said memory access operation is permitted, to allow further processing of said memory access operation using said target address as a physical address; and if said address translation means is selected for handling said memory access operation, then said address translation means is configured to translate said target address from a virtual address to a physical address for said memory access operation using a corresponding address translation entry corresponding to a page including said target address.

Viewed from a further aspect, the present invention provides a data processing method comprising:

performing memory access operations for accessing data from a memory;

storing in a memory protection unit sets of permission data for defining access permissions for corresponding regions of a memory address space; and storing in an address translation unit address translation entries for defining virtual-to-physical address mappings for corresponding pages of the memory address space;

in response to a memory access operation specifying a target address, selecting in dependence on said target address which of said memory protection unit and said address translation unit to use for handling said memory access operation;

if said memory protection unit is selected for handling said memory access operation, determining whether said memory access operation is permitted using a corresponding set of permission data corresponding to a region including said target address, and if said memory access operation is permitted, allowing further processing of said memory access operation using said target address as a physical address; and if said address translation unit is selected for handling said memory access operation, translating said target address from a virtual address to a physical address for said memory access operation using a corresponding address translation entry corresponding to a page including said target address.

Embodiments of the invention will now be described, by way of example only, with reference to the accompanying drawings in which:

FIG. 1 schematically illustrates a system supporting multiple virtualised real time processors together with a virtualised processor using virtual memory;

FIG. 2 schematically illustrates a processing system providing both a first and second memory protection unit together with a memory management unit;

FIG. 3 schematically illustrates the storage of configuration data within a coprocessor;

Figure 7:
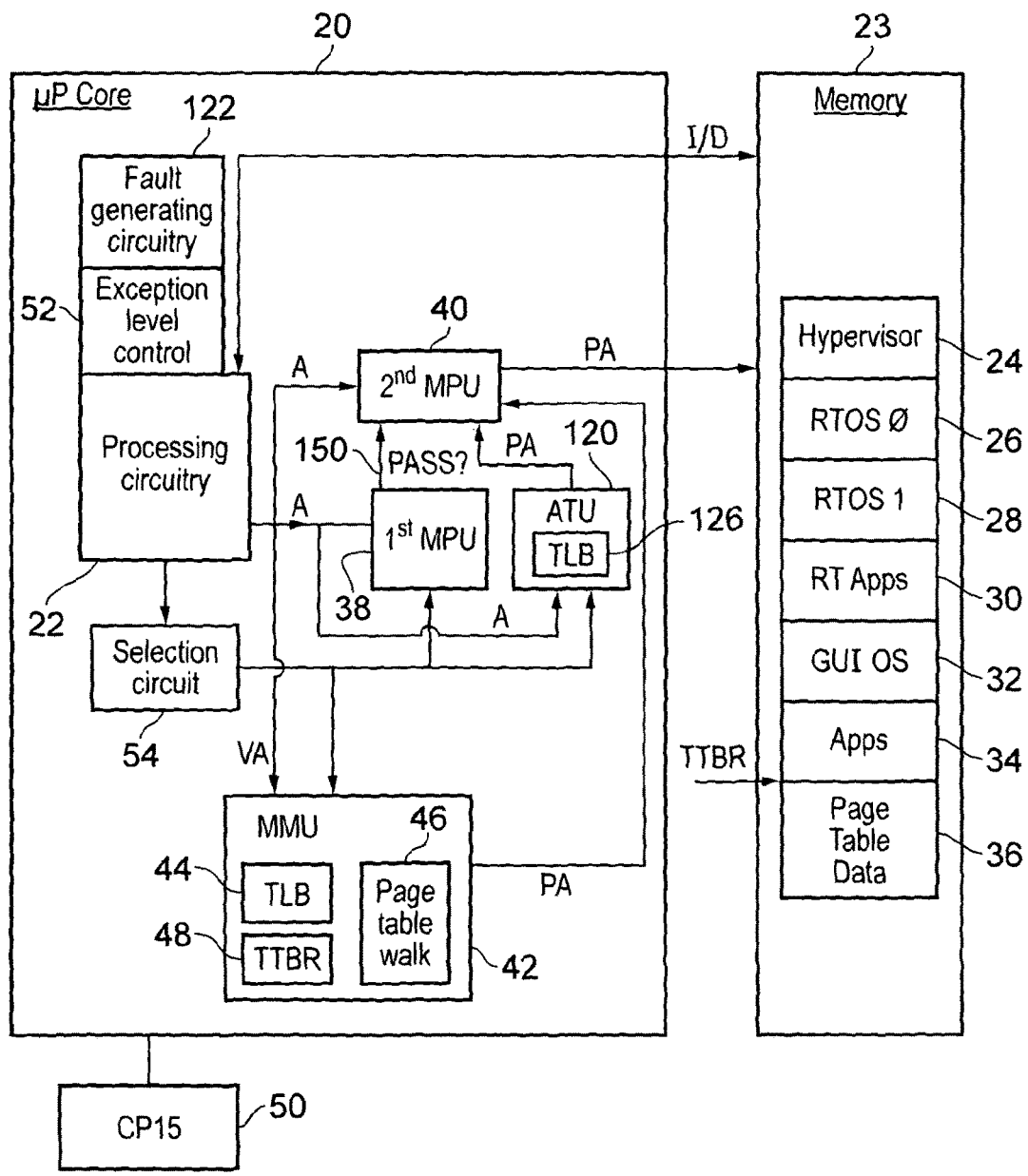
FIG. 7 shows an example of a processing system having an address translation unit for operating concurrently with the first memory protection unit.
Figure 8:
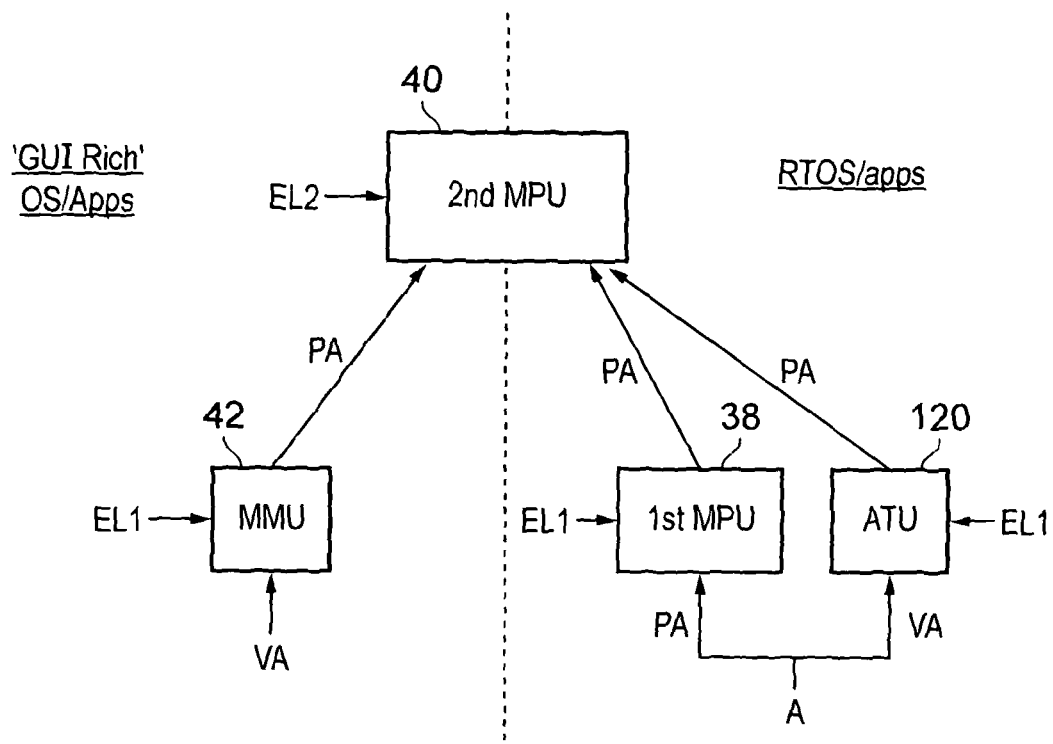
Figure 9:
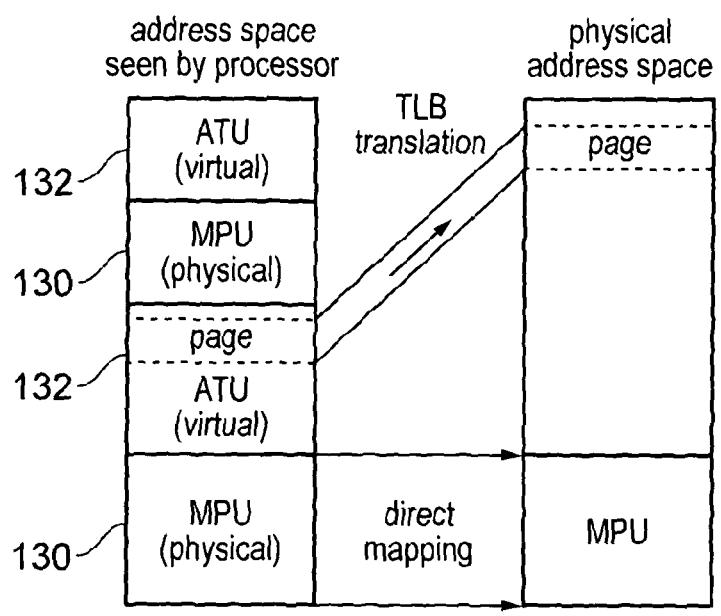
Figure 10:
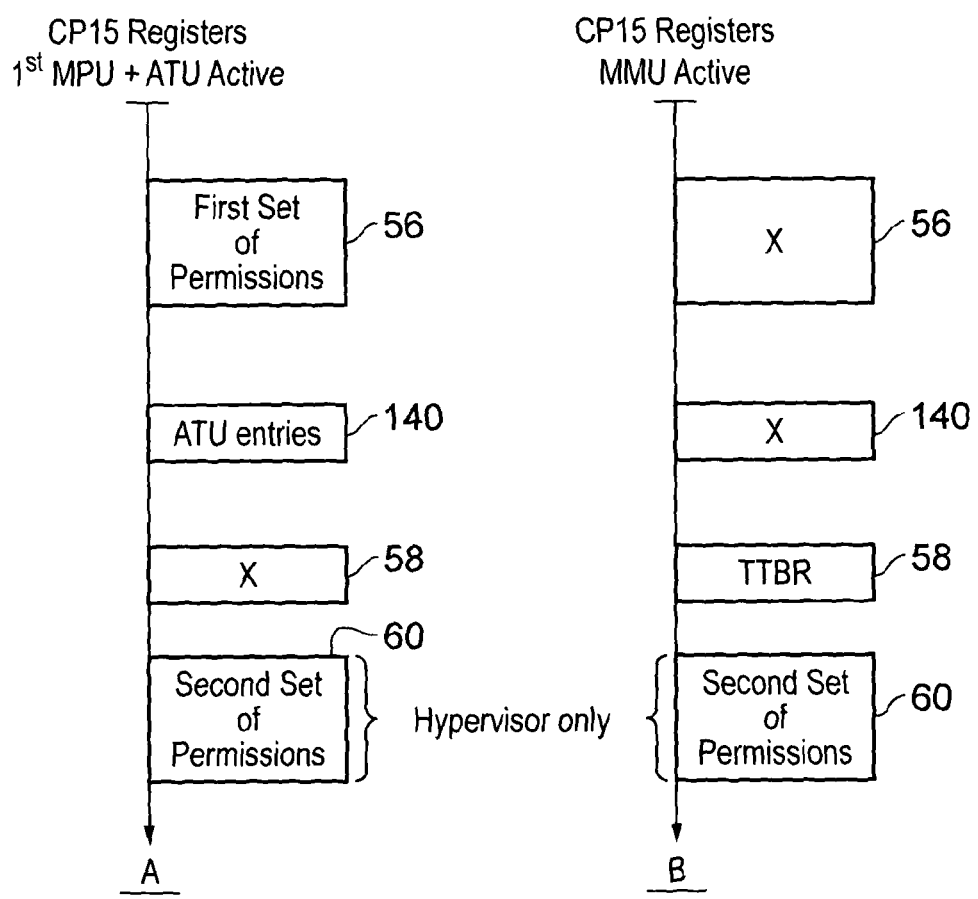
Figure 11:
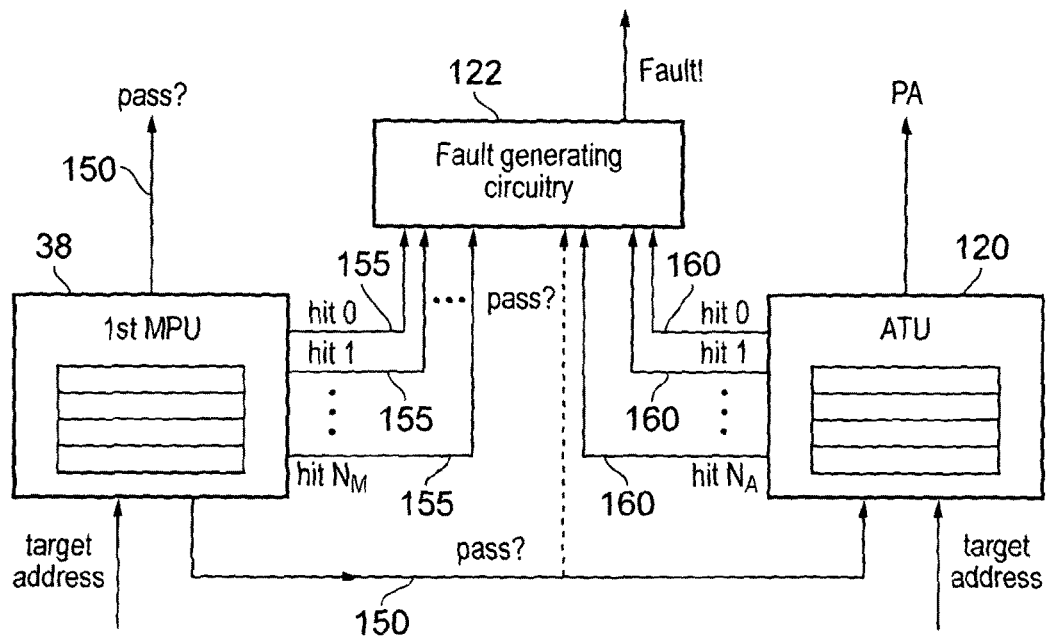
Figure 12:
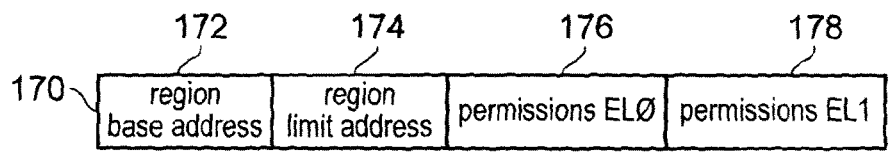
Figure 13:
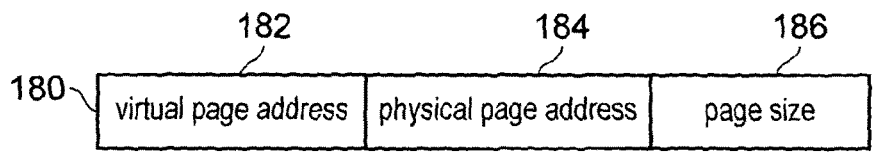
Figure 14:
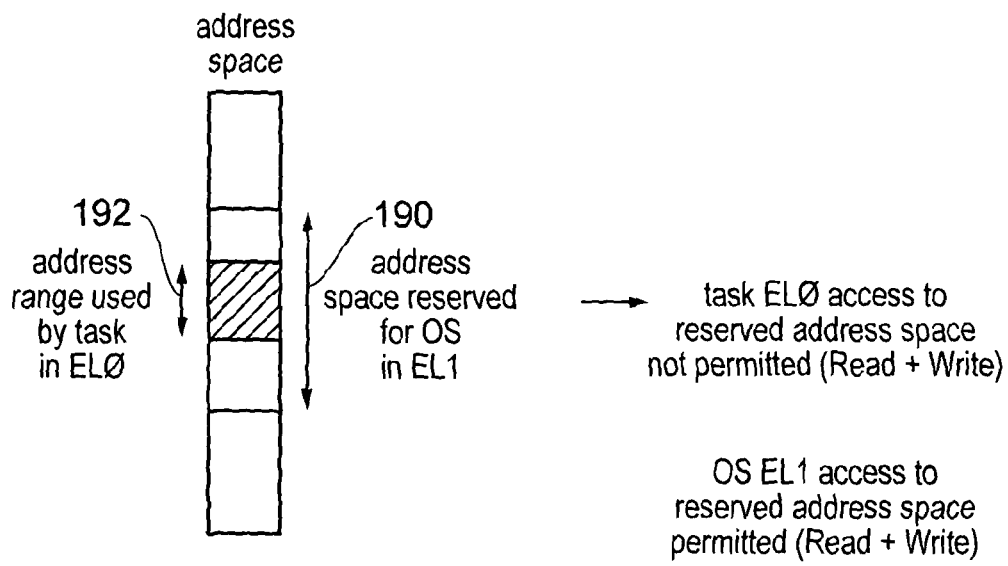
Figure 14:
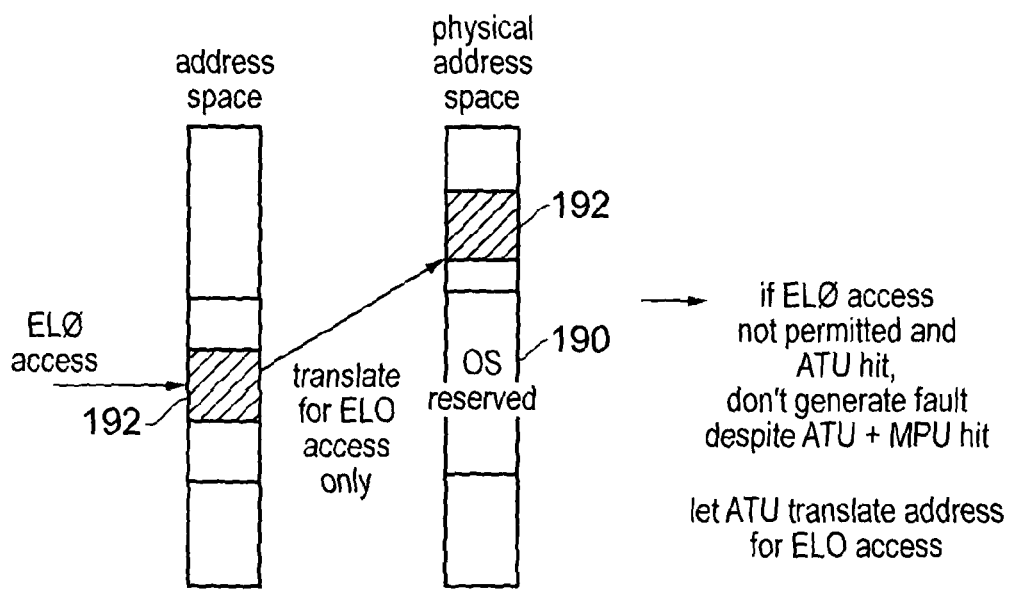
Figure 15:
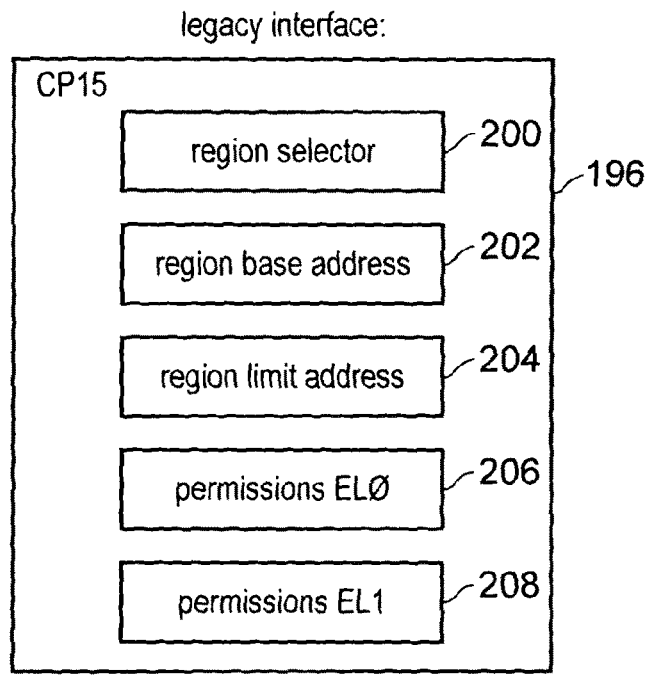
Figure 16:
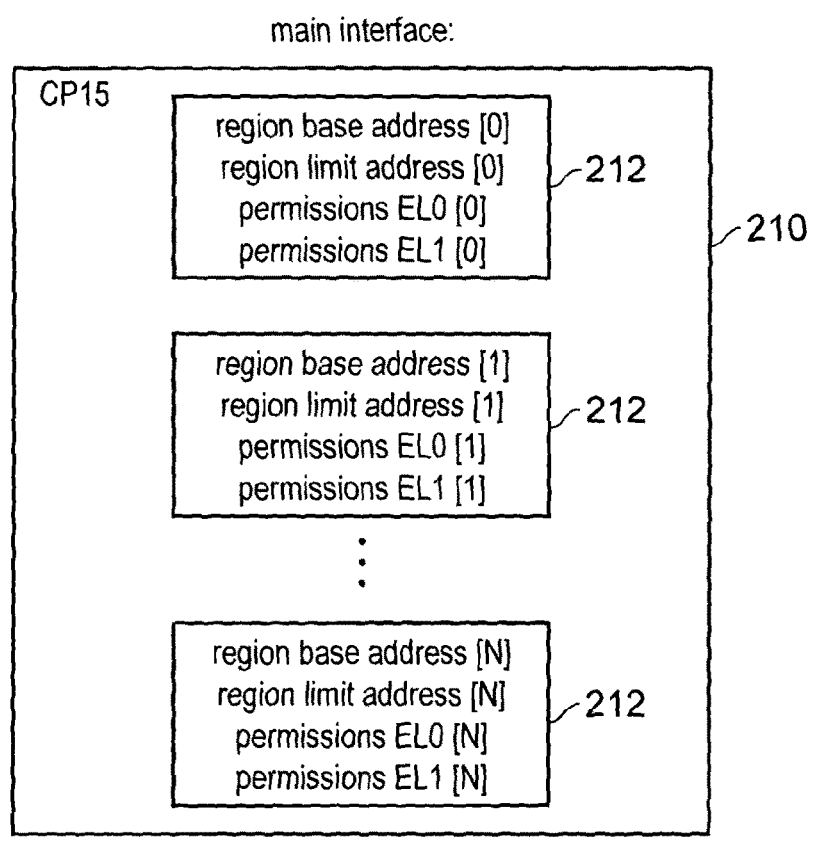
Figure 17:
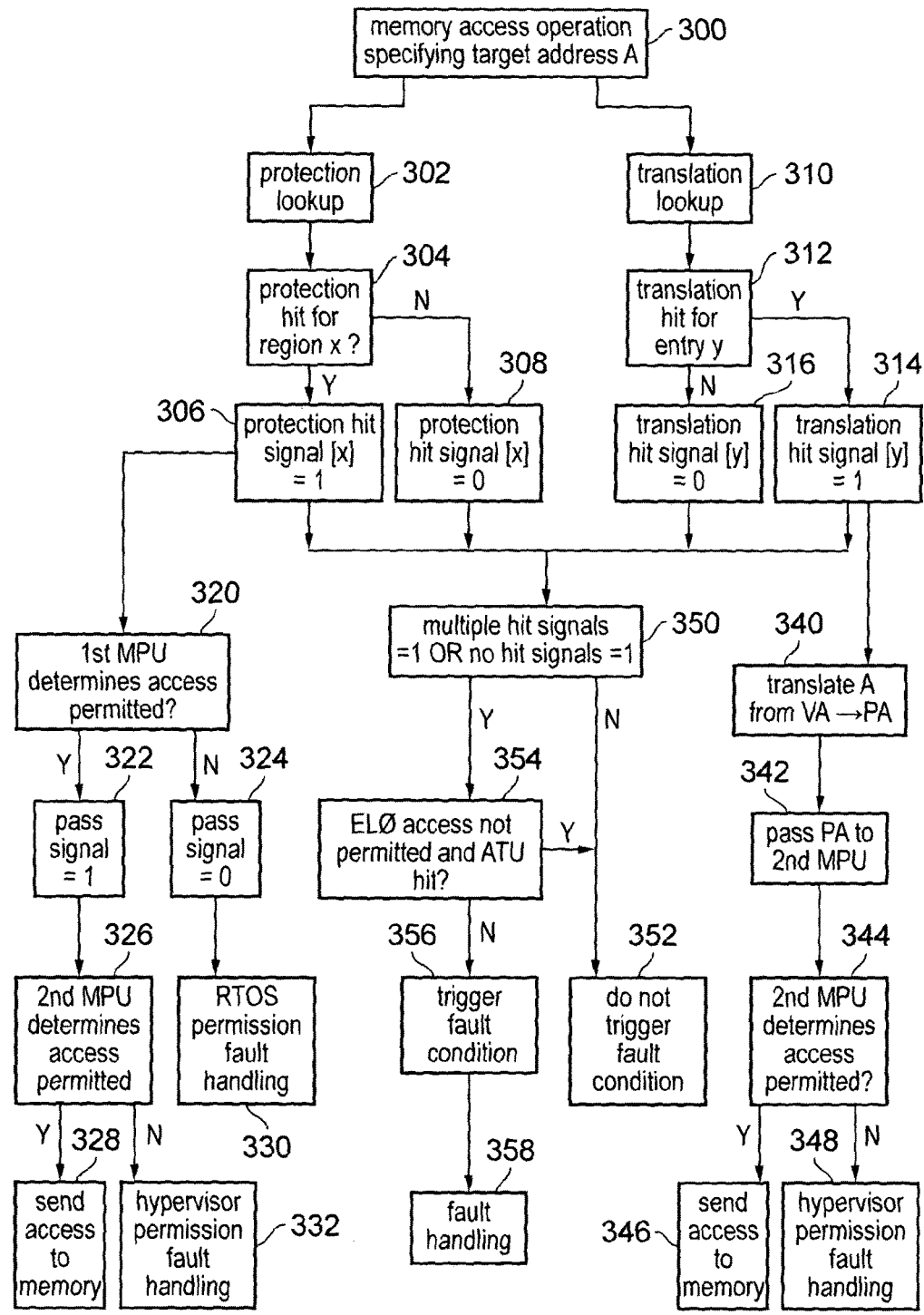
Figure 18:
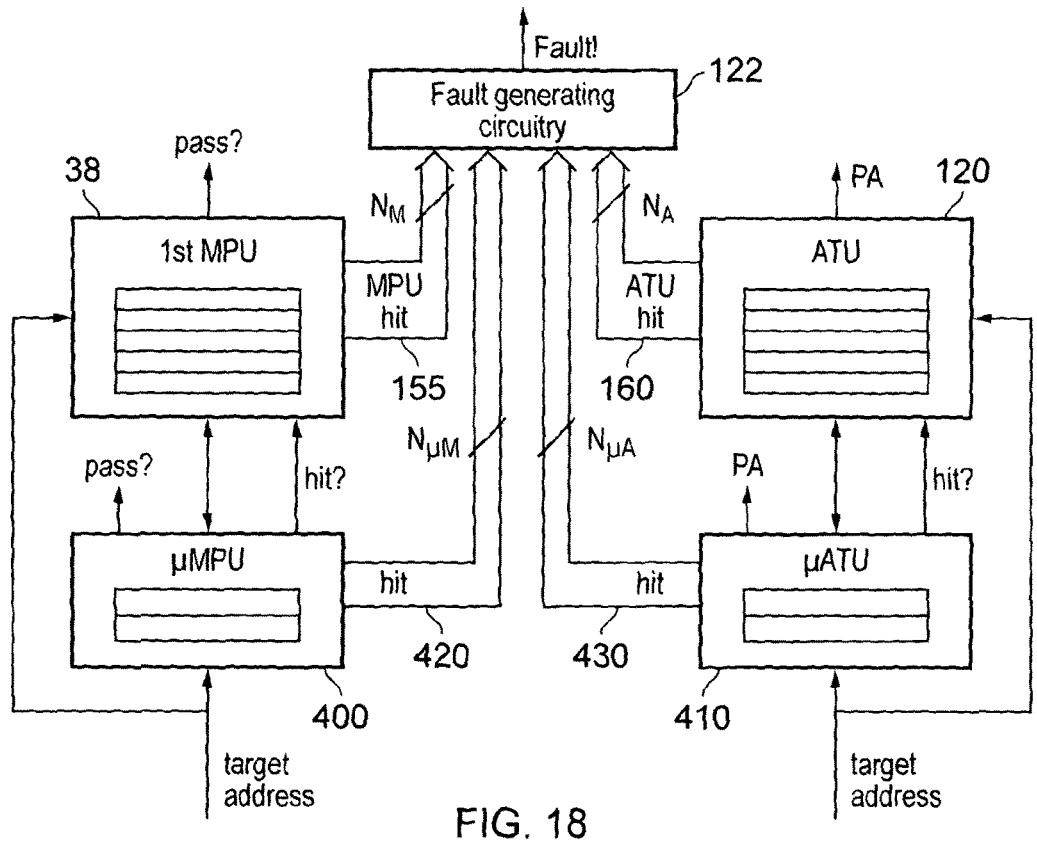
Figure 19:
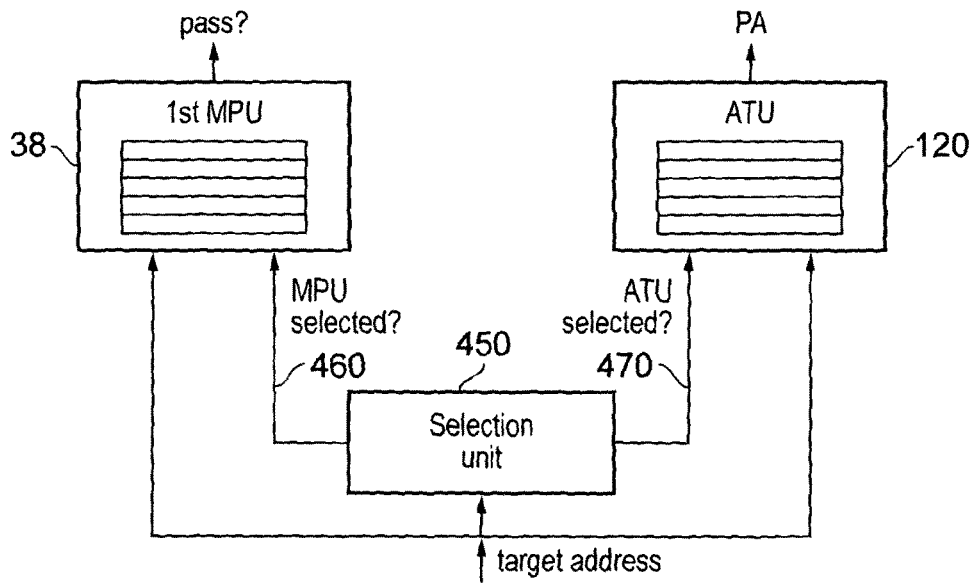

FIG. 8 schematically illustrates the handling of memory accesses for different operating systems of the processing system of FIG. 7;

FIG. 9 shows an example of mapping addresses generated by the processing circuitry for memory access operations to physical addresses identifying physical locations in memory;

FIG. 10 illustrates the storage of configuration data within the coprocessor for the processing system of FIG. 7;

FIG. 11 shows in more detail the first memory protection unit, the address translation unit and fault generating circuitry;

FIG. 12 shows an example of a set of permission data stored in the first memory protection unit;

FIG. 13 shows an example of an address translation entry stored in the address translation unit;

FIG. 14 shows an example of suppressing generation of a fault condition if the first memory protection unit determines that a memory access of a particular privilege level is not permitted;

FIG. 15 shows an example of a legacy interface for updating the permission data of the first memory detection unit;

FIG. 16 shows an example of a main interface for updating the permission data of the first memory protection unit;

FIG. 17 is a flow diagram illustrating a method of processing memory access operations using the system of FIG. 7;

FIG. 18 shows an example including a memory protection cache and an address translation cache for speeding up lookup operations for the memory protection unit and address translation unit respectively; and FIG. 19 illustrates an example including a selection unit for selecting which of the memory protection unit and the address translation unit to use for handling a memory access request.

Figure 1:
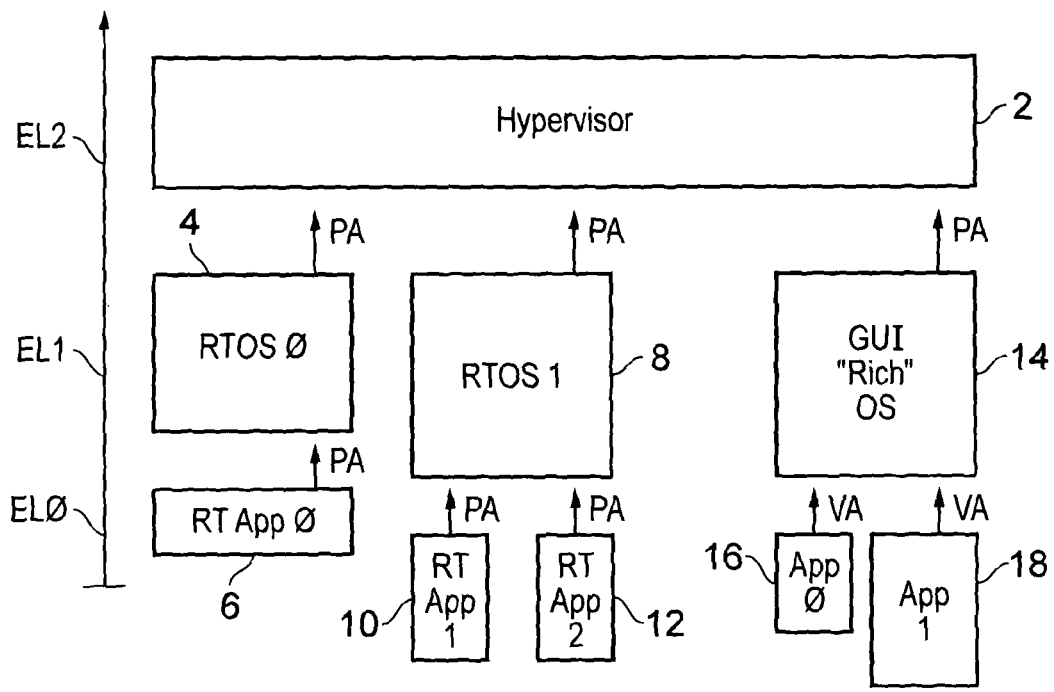

FIG. 1 schematically illustrates a system supporting multiple virtualised real time processors and a virtualised processor using virtual memory. A hypervisor program 2 operates at a second exception level EL2 and serves to control switching between virtualised processors and to protect/isolate these virtualised processors from each other. A first virtualised real time processor uses a first real time operating system 4 to support execution of a real time application 6. Both the real time application 6 and the real time operating system 4 generate physical addresses PA when they specify memory access operations. The physical addresses PA generated by the real time application 6 are subject to a first level of memory protection (on behalf of the guest real time operating system 4) enforced by a first memory protection unit controlled by the real time operating system 4. If the memory access request is permitted by this first set of permissions, then the memory access operation is also checked against a second set of permissions which are managed by the hypervisor 2 using the second memory protection unit. The first memory protection unit and the second memory protection unit are provided by hardware elements that are configured with the appropriate first set of permission data and second set of permission data to enforce the policies of the real time operating system 4 and the hypervisor 2 respectively. Thus, the first set of permissions and the second set of permissions which are controlled by the real time operating system 4 and the hypervisor 2 can be enforced by the memory protection unit hardware without requiring the real time operating system 4 or the hypervisor 2 to run at that time.

Also illustrated in FIG. 1 is a further real time operating system 8 supporting multiple real time applications 10, 12. As before, the real time applications 10, 12 generate physical addresses PA which are checked against the first set of permissions and the second set of permissions by the first memory protection unit and the second memory protection unit respectively. The real time operating system 4 and the real time application 6 are considered to execute upon a virtualised real time processor which is distinct from the virtualised real time processor upon which the real time operating system 8 and the real time applications 10, 12 execute. The hypervisor 2 switches between these two virtualised real time processors by swapping context/configuration data on the underlying hardware. The underlying hardware provides the first memory protection unit and the second memory protection unit in order to support rapid application of the first set of permissions and the second set of permissions in a manner consistent with real time operation.

Also illustrated in FIG. 1 is a further operating system 14 which is in the form of a "rich" operating system supporting a graphical user interface, such as Windows, iOS, Linux, etc. Multiple application 16, 18 execute using this further operating system 14. The applications 16, 18 generate virtual addresses which are translated by a memory management unit that is configured and controlled by the further operating system 14. The virtual addresses are translated into physical addresses which are then checked against the second set of permissions by the second memory protection unit. Thus, the further operating system 14 utilises a memory management unit to translate and apply appropriate permissions on behalf of the further operating system 14 and then the second memory protection unit serves to apply permissions on behalf of the hypervisor 2.

Figure 2:
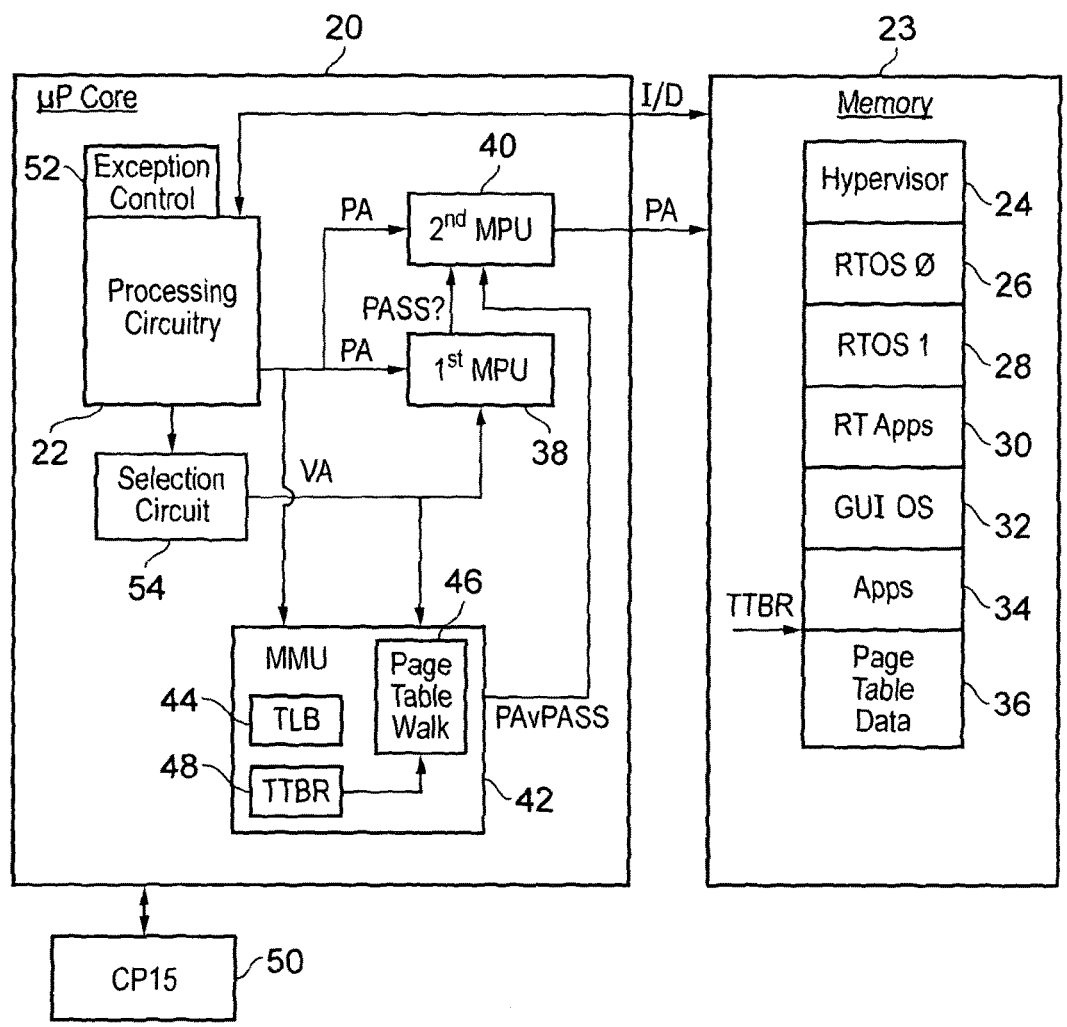

FIG. 2 schematically illustrates processing hardware of a form suitable for supporting the software architecture illustrated in FIG. 1. A microprocessor core 20 includes processing circuitry 22 for executing a stream of program instructions. The stream of program instructions are read from a memory 23 which includes program instructions providing a hypervisor 24, a first real time operating system 26, a second real time operating system 28, real time applications 30, a further "non-real time" operating system 32 and applications 34 for that further operating system. Also included within the memory 23 is page table data 36 used to form memory mapping data via page table walk operations.

The microprocessor core 20 includes a first memory protection unit 38, a second memory protection unit 40 and a memory management unit 42. The memory management unit 42 includes a translation lookaside buffer 44, page table walking circuitry 46 and a translation table base register 48. The translation table base register 48 stores a translation table base register value which points to the start of the page table data 36 within the memory 23. The page table walk circuitry 46 uses this translation table base register value in performing a page table walk operation in order to retrieve memory mapping data into the translation lookaside buffer 44.

The first memory protection unit 38 applies a first set of permissions which are read from registers within a coprocessor 50. The second memory protection unit 40 applies a second set of permissions which are also read from the coprocessor 50. The first memory protection unit 38 and the second memory protection unit 40 operate in parallel using the same physical address to perform checks in accordance with the first set of permissions and the second set of permissions respectively. Exception level control circuitry 52 serves to control a current exception level (namely EL0 for applications, EL1 for operating systems and EL2 for the hypervisor) at which the processing circuitry 22 is currently operating. Selection circuitry 54 is provided to control which one of the memory management unit 44 and the first memory protection unit 38 is active at a given point in time. The first memory protection unit 38 will be active when the code executing is real time code, such as one of the real time operating systems 4, 8, or one of the real time applications 6, 10, 12. The memory management unit 42 will be active when one of the further operating systems 14 or the applications 16, 18 are executing. When the hypervisor is active, then only the second memory processing unit 40 will be in use so as to avoid the memory management unit 42 or the first memory protection unit 38 inappropriately interfering with the action of the hypervisor 2. Changes between the first memory protection unit 38 being active and the memory management unit 42 being active are made via a transition to the second exception level EL2 and under control of the hypervisor 2 executing at the second exception level EL2. When a return is made from the second exception level EL2 and the hypervisor 2 back to one of the operating systems 4, 8, 14, then a selection bit is output from the processing circuitry to the selection circuitry 54 and serves to control whether the first memory protection unit 38 or the memory management unit 42 will be active.

The processing circuitry 22 generates addresses associated with memory accesses to be performed within the memory 23. If the first memory protection unit 38 is currently selected to be active, then these memory addresses will be physical addresses PA. If the memory management unit 42 is selected to be active, then these memory addresses will be virtual addresses VA. A physical address PA will be checked against the first set of permission data by the first MPU 38 to generate a Pass signal which is supplied to the second MPU 40. The second MPU 40 will also check the physical address against the second set of permissions. If the result of the check by the first MPU 38 is a pass and the second MPU 40 also passes the memory access against its second set of permissions, then a physical address PA is output to the memory 23 to drive the memory access.

In the case of the memory management unit 42 being active, then the processing circuitry 22 generates a virtual address VA associated with a memory access. This virtual address VA is supplied to the memory management unit 42 and is translated via memory mapping data (held within the translation lookaside buffer 44 or recovered from the page table data 36 via a page table walk) to generate a physical address PA. The memory management unit 42 also performs a check of the virtual address VA against virtual memory permissions contained within the memory management data retrieved from the page table data 36. If the virtual address VA is successfully translated and passes the virtual memory permissions, then the memory management unit 42 outputs to the second MPU 40 a translated physical address PA and a signal indicating a pass of the virtual memory permissions The second MPU 40 then applies the second set of permission data on behalf of the hypervisor 2 and if this check is passed, then a physical address PA is output to the memory 23 to perform the memory access requested. As the action of the memory management unit 42 may include the need to perform a page table walk operation, then the time necessary to perform a given memory access can vary considerably and this is a reason why virtual addressing using the memory management unit 42 is inappropriate when real time operations are desired.

Figure 3:
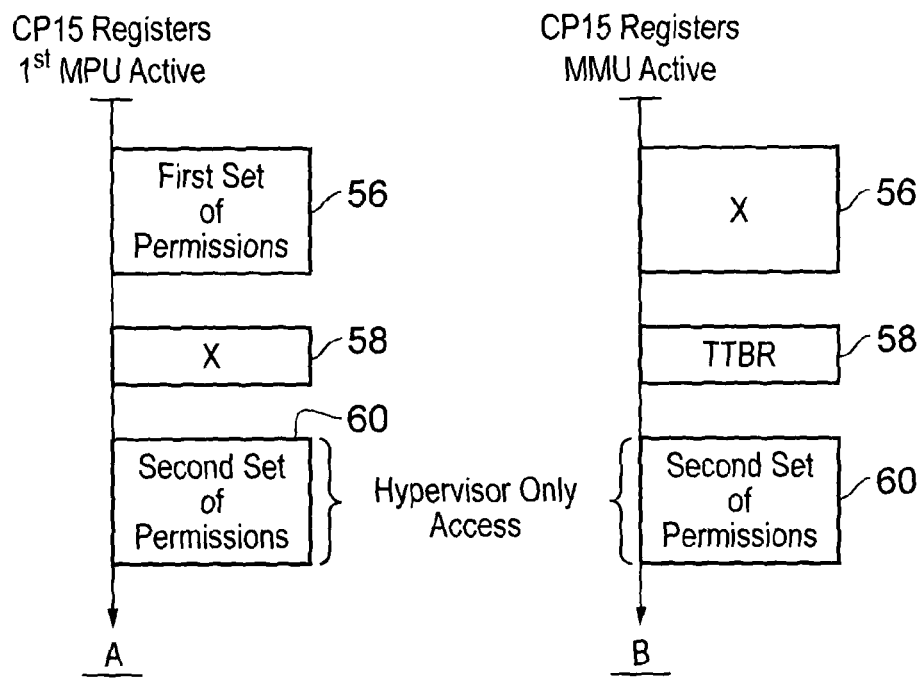

FIG. 3 schematically illustrates a set of memory mapped registers within the coprocessor 50. These memory mapped registers are shown in state A when the first MPU 38 is active. The same registers are shown in state B when the memory management unit 42 is active. The first set of permissions is stored within a set of registers 56 which can be accessed by the processing circuitry 22 and the first MPU 38 when the first MPU 38 is active. A translation table base register 58 is inaccessible to the processing circuitry 22 when the first MPU 38 is active. A set of registers 60 stores the second set of permissions on behalf of the hypervisor 2 which is used by the second MPU 40. This second set of permissions is only accessible when executing at the second exception level (EL2) corresponding to execution of the hypervisor 2.

The situation shown as B in FIG. 3 is when the memory management unit 42 is active. In this situation the registers 56 are not accessible to the processing circuitry 22, the translation table base register 58 is accessible to the processing circuitry 22 and the registers 60 storing the second set of permissions is again only accessible to the hypervisor when the second exception level EL2 is active.

Figure 4:
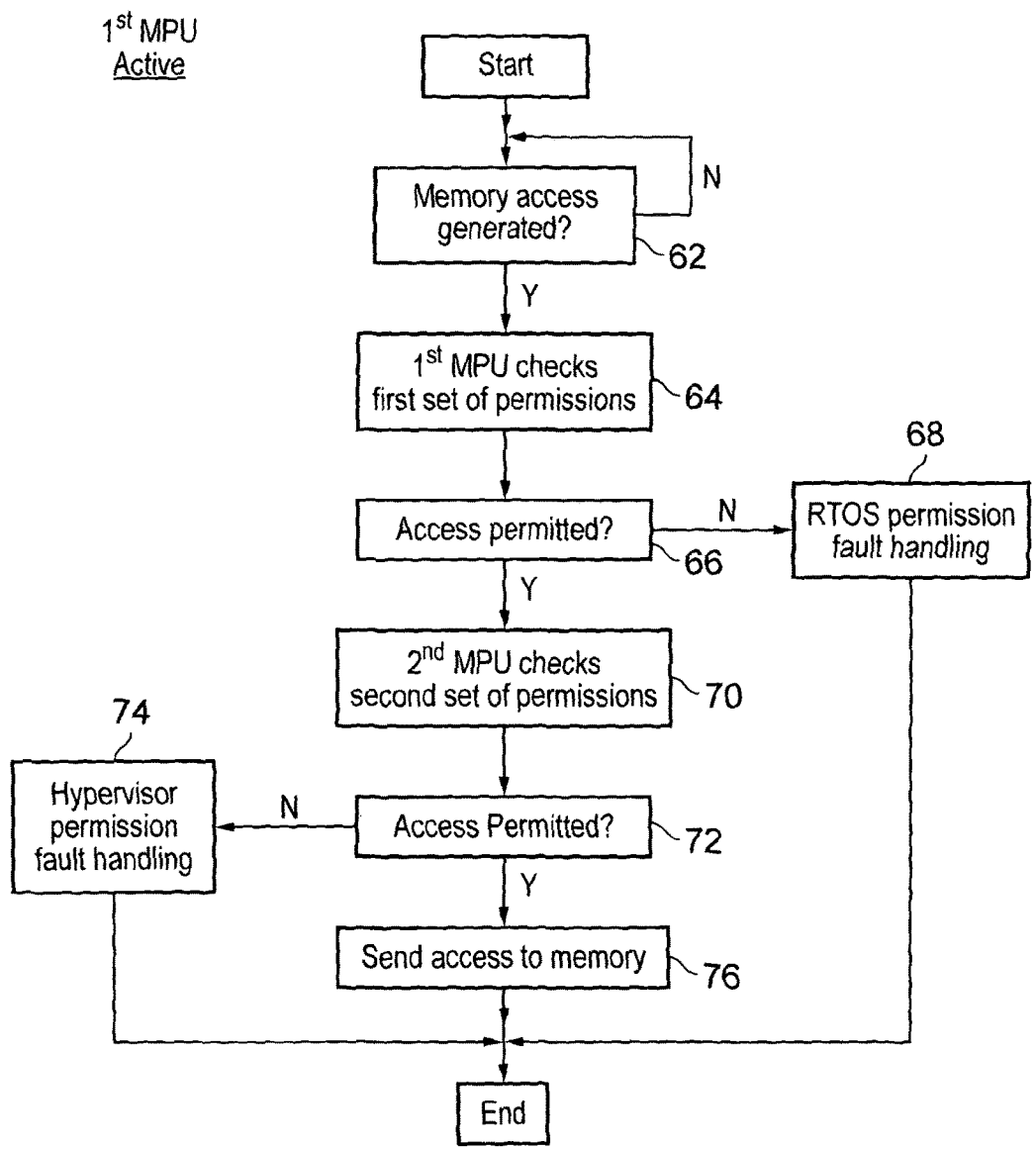
FIG. 4 is a flow diagram schematically illustrating the handling of a memory access when the first memory protection unit is active.

FIG. 4 is a flow diagram schematically illustrating the operation of the circuit of FIG. 2 when the first MPU 38 is active. At step 62 processing waits until a memory access is generated. At step 64 the first memory protection unit 38 checks the received physical address PA against the first set of permissions. If the determination at step 66 is that access is not permitted, then step 68 triggers a permission fault to be handled in accordance with whatever policies have been set up on behalf of one of the real time operating systems 4, 8. Processing then terminates.

If the determination at step 66 is that access is permitted by the first memory protection unit 38, then step 70 serves to perform a check of the physical address PA against the second set of permissions by the second memory protection unit 40. Step 72 determines whether or not this second set of permissions indicates that access is permitted. If access is not permitted, then step 74 performs fault handling on behalf of the hypervisor 2. If access is permitted, then step 76 serves to send the access to the memory 22.

Figure 5:
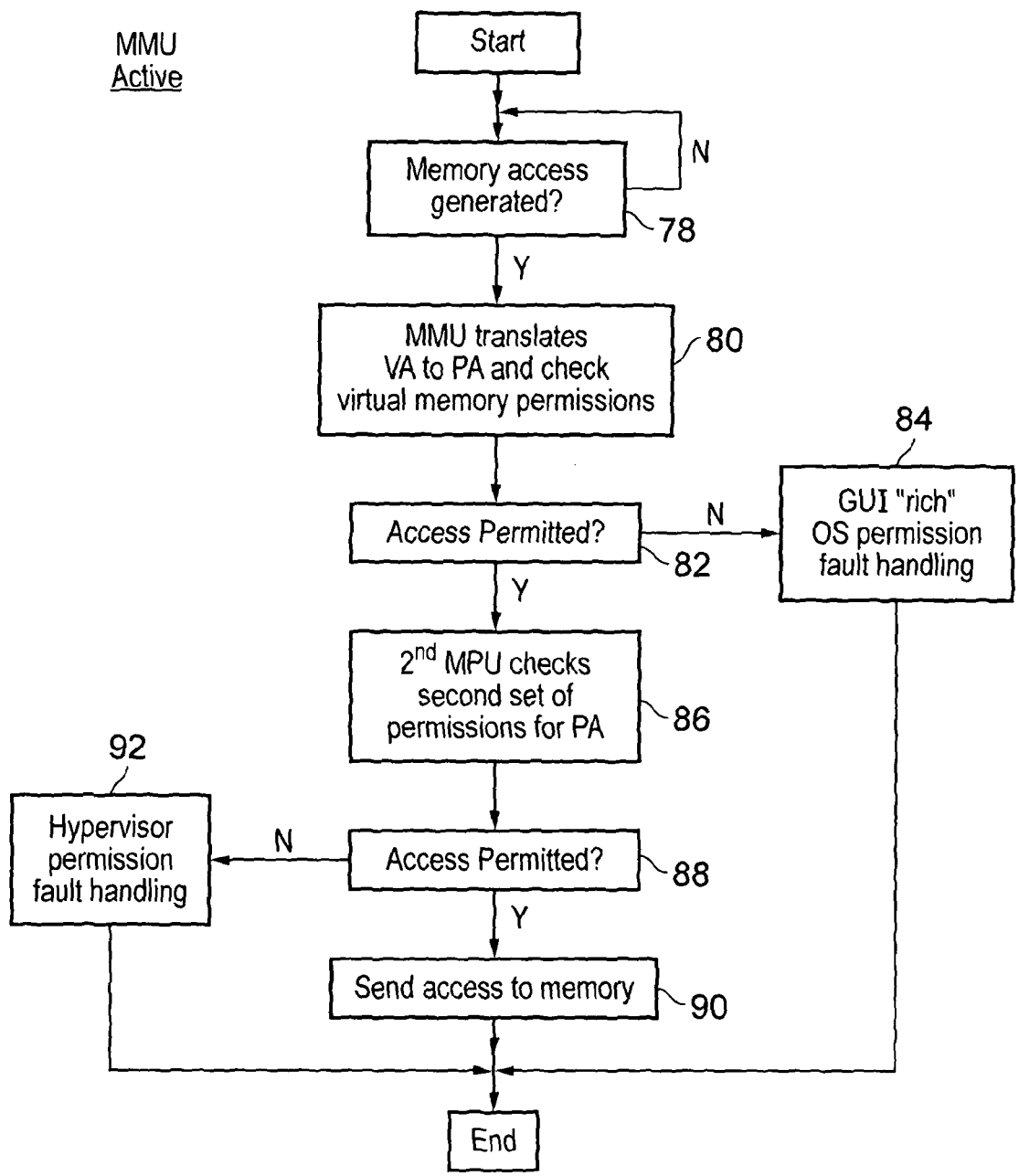
FIG. 5 is a flow diagram schematically illustrating the handling of a memory access when a memory management unit is active.

FIG. 5 is a flow diagram schematically illustrating processing when the memory management unit 42 is active. At step 78 processing waits until a memory access is generated. Step 80 corresponds to the memory management unit 42 translating the virtual address VA to a physical address PA and checking the address against the virtual memory permissions. If the determination at step 82 is that access is not permitted, then fault handling on behalf of the operating system 14 is performed at step 84. If access is permitted at step 82, then step 86 serves to check the physical address generated at step 80 against the second set of permissions applied by the second memory protection unit 40. If the determination at step 88 is that access is permitted in accordance with the second set of permissions, then step 90 serves to send the access to the memory 22. If the determination at step 88 is that access is not permitted, then step 92 performs fault handling on behalf of the hypervisor 2.

Figure 6:
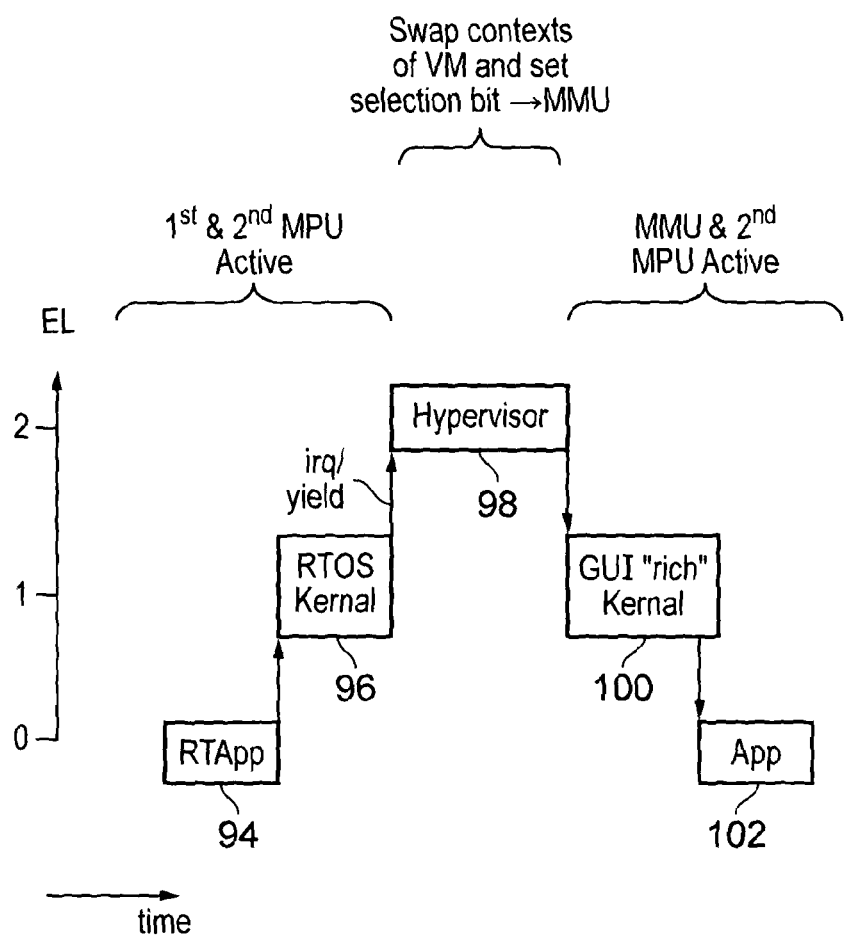
FIG. 6 is a diagram schematically illustrating the switching between virtualised processors via a hypervisor and different associated exception levels.

FIG. 6 is a diagram schematically illustrating the switching between whether the first memory protection unit 38 or the memory management unit 42 is active. At period 94 a real time application is executed at a lowest (least privileged) exception level EL0. At period 96 processing has passed to the execution of the kernel of the real time operating system 4, 8 at exception level EL1. At this time, processing could again return back to a further real time application with a transition back to exception level EL0. However, in the example illustrated, an interrupt IRQ or a yield trigger occurs whilst the real time operating system kernel 96 is executing and this triggers execution of the hypervisor in period 98 and switches the processing circuitry to exception level EL2. Throughout execution of the real time application in period 94 and the real time operating system kernel in period 96 the first MPU 38 and the second MPU 40 are active. The action of the hypervisor in period 98 includes swapping contexts between the virtual machines to be virtualised by the processing hardware of FIG. 2 from one in which the first MPU 38 is active to one in which the MMU 42 is active. This context switch typically will involve swapping register contents associated with saved contexts from the previous execution of the virtual machine being swapped in as well as saving of registers and other data associated with the virtual machine being swapped out. When the hypervisor 2 finishes its execution during period 98 the system moves back to exception level EL1 and sets a selection bit that is output to the selection circuitry 54. This serves to switch from the first memory protection unit 38 being active to the memory management unit 42 being active. Period 100 corresponds to execution of the graphical user interface supporting operating system 14 at exception level EL1 before execution of an application 16, 18 in period 102 is performed. The processing in period 102 will generate virtual addresses VA and will use the memory management unit 42 to perform translation of virtual addresses VA to physical addresses PA as well as applying virtual memory permissions.

FIG. 7 shows a second example of a processing apparatus. In this example, the microprocessor core 20 is the same as in FIG. 2, except that it further comprises an address translation unit 120 and fault generating circuitry 122. Otherwise, the elements of the processing apparatus in FIG. 7 are the same as the corresponding elements in FIG. 2 and are illustrated with the same reference numeral.

The address translation unit (ATU) 120 includes a translation lookaside buffer (TLB) 126 which stores translation entries each specifying a virtual-to-physical address mapping for a corresponding page of the memory address space. A page of memory is a range of the memory address space which corresponds to a translation lookaside buffer entry in the TLB 126. Unlike the MMU 42, the ATU 120 does not have page table walking circuitry 46 or a translation table base register 48. Instead, updating of the TLB 126 of the ATU 120 is performed by software executing on the processing circuitry 22. The software (for example, real time operating system software) writes updated data to memory mapped registers of the coprocessor 50, and the TLB 126 reads the updated data from the coprocessor 50. By eliminating page table walks for the ATU 120, the ATU is suitable for use in a real time system, even with virtual-to-physical address translation.

FIG. 8 schematically illustrates the relationship between the various memory access handling units in the embodiment of FIG. 7. As shown in FIG. 1, the system may operate under control of either a real time software (such as real time operating system (RTOS) 26, 28 or real time applications 30) or non-real-time software (such as "GUI rich" operating system 32 or non-real time applications 34). Switching between the real-time and non-real-time states shown in FIG. 8 is controlled in the same way as discussed above for FIGS. 1-6.

When the non-real-time software is active then the MMU 42 translates virtual addresses specified by the processor 22 to physical addresses directly identifying physical locations in memory 23, and the physical addresses are then passed to the second MPU 40 for controlling whether the memory access is permitted based on access permissions set by the hypervisor 24 while at exception level EL2. This is the same as the MPU 42 discussed previously with respect to FIGS. 1-6.

When real time software 26, 28, 30 is active then a target address A for a memory access operation generated by the processor 22 is passed to both the first MPU 38 and the ATU 120. The first MPU 38 performs a protection lookup to determine whether the first MPU 38 stores any sets of permission data corresponding to the target address. Also, the ATU 120 performs a translation look up to determine whether the ATU 120 stores any translation entries corresponding to the target address. The first MPU 38 and ATU 120 are programmable by operating system software at exception level EL1.

If the target address hits in the first MPU 38 then the target address is interpreted as a physical address PA which directly specifies a memory location within the memory 23. In this case, the first MPU 38 determines, using the set of permission data corresponding to a region including the target address, whether the memory access operation is allowed. If the memory access operation is allowed, the physical address (equal to the target address) is used by the second MPU 40 to apply hypervisor access permissions.

On the other hand, if the target address corresponds to a translation entry (TLB entry of the TLB 126) in the address translation unit 120, then the target address is interpreted as a virtual address VA and is translated into a physical address PA using the corresponding translation entry of the ATU 120. The physical address PA generated by the ATU 120 is then supplied to the second MPU 40 to control whether the access is permitted using the hypervisor-controlled permission data. Optionally the ATU 120 may also provide some access permission control.

Therefore, when real time software is active, both the first MPU 38 and ATU 120 are active concurrently with some memory accesses being processed using the first MPU 38 and other memory accesses being processed using the ATU 120. This is different to the relationship between the MMU 42 and first MPU 38 where only one of these units is active depending on whether real-time or non-real-time software is executed. Which of the first MPU 38 and ATU 120 is used to process a given memory access operation is selected based on the target address of the memory access operation. As shown in FIG. 9, the memory address space as seen by the processing circuitry 22 is effectively partitioned into some address ranges 130 corresponding to the first MPU 38 and other address ranges 132 corresponding to the ATU 120. The addresses in the memory regions 130 corresponding to the first MPU 38 are mapped directly to corresponding physical addresses in a physical address space. The virtual addresses in regions 132 corresponding to the address translation unit 120 can be translated to different physical addresses using a translation entry of the ATU 120. The partitioning of the regions 130, 132 is set by software so that the software programmer can control which unit 38, 120 should be used for each memory access.

The combination of the first MPU 38 and ATU 120 is useful for a real time application. Usually, the first MPU 38 would be preferred since it operates directly with physical addresses and so offers quick and deterministic response times. However, for some legacy software applications 30 the addresses referred to by the software may conflict with addresses used for other applications and so relocating these addresses in the address space using the virtual-to-physical address translation of the ATU 120 enables such applications to coexist. As the ATU does not have page table walking circuitry 46 and is programmable directly by software, the ATU 120 has a reasonably deterministic response time and so is suitable for real time systems.

The sets of permission data of the first MPU 38 and the translation table entries of the TLB 126 in the ATU 120 are programmable by software using memory mapped configuration registers of the coprocessor 50. FIG. 10 illustrates an example of the configuration registers. FIG. 10 is the same as FIG. 3 except that the coprocessor in this embodiment includes additional registers 140 for storing data defining the translation table entries of the ATU 120. The registers 140 defining the translation entries can only be accessed when in state A where the selection circuit 54 has selected the first MPU 38 and ATU 120 to be active and cannot be accessed in state B when the MMU 42 is active.

FIG. 11 shows in more detail an example of the first MPU 38, the ATU 120 and the fault generating circuitry 122. The target address is provided to both the first MPU 38 and the ATU 120, and both units 38, 120 perform a lookup operation to search for data corresponding to the target address.

In some examples the first MPU may look up the permission data corresponding to the target address in parallel with the ATU 120 looking up a translation entry for the target address. This implementation is faster as both lookups can be performed simultaneously.

However, a more energy efficient implementation can be provided where the ATU 120 lookup is performed after the lookup in the first MPU 38. If the first MPU 38 determines that the memory access is not permitted using the obtained set of permission data, then it may not be necessary to perform a lookup in the ATU 120, and so to save power the ATU lookup can be omitted (assuming that the system designer wishes to prohibit all memory accesses that are not permitted by the first MPU 38; this may not always be the case as discussed with respect to FIG. 14 below). Therefore, the first MPU 38 may issue a pass signal 150 to the ATU indicating whether, if there is an MPU hit, the corresponding permission data indicates whether the memory access is allowable. If the pass signal 150 indicates that the access is not allowable, then the ATU 120 omits the lookup, while if there is no hit in the MPU 38 or the access is allowable then the ATU 120 performs the lookup.

As shown in FIG. 11, the first MPU 38 generates a set of protection hit signals 155 each corresponding to an entry of the first MPU 38 and indicating whether the target address is within the region of the address space defined for the corresponding entry. Similarly, the ATU 120 generates a set of translation hit signals 160 each corresponding to one of the translation entries in the TLB 126 and indicating whether the corresponding entry is for a page of addresses including the target address.

The fault generating circuitry 122 generates a fault condition if more than one of the hit signals 155, 160 indicates a hit. The fault may be caused by hits in both of the first MPU 38 and the ATU 120 or may be caused by multiple hits in different entries of the first MPU 28, or by multiple hits in different entries of the ATU 120. By preventing multiple simultaneous hits, processing of a memory access request can be ensured to be predictable and safe. If there are multiple hits then this could lead to unpredictable behaviour. For example, attempting to apply two different sets of access permissions using the first MPU 38, or attempting to interpret the same target address as a physical address using the first MPU 38 and as a virtual address using the ATU 120, could lead to indeterminate results. By generating a fault, these situations can be flagged. The apparatus may be provided with fault handling software routines in memory 23 for addressing the faults or flagging the faults to the attention of the system operator. Hence, the fault generating circuitry 122 ensures that the programmer of the system should avoid overlaps between the regions 130, 132 defined for the MPU and ATU as shown in FIG. 9.

The fault generating circuitry 122 may also generate a fault if none of the hit signals 155, 160 indicates that a MPU or TLB entry corresponds to the target address.

FIG. 12 shows an example of a permission entry of the first MPU 38. Each entry 170 may include a region base address 172 defining a base address of the corresponding memory region and a region limit address 174 defining the limit address of the region. Typically, the limit address 174 would have a larger value than the base address 172. When performing the protection lookup, the first MPU 38 would determine that the entry 170 corresponds to the target address if the target address lies between the base address 172 and the limit address 174 (or is equal to one of the addresses 172, 174). The base address 172 and limit address 174 enable arbitrary sizes of memory regions to be defined using the first MPU 38. The MPU entry 170 also includes permission data 176, 178 defined for memory access requests of different privilege levels EL0, EL1. For example, permission data 176 is defined for the application privilege level EL0 and permission data 178 is defined for the operating system privilege level EL1. The permission data 176, 178 includes various parameters controlling properties of the memory access. For example, the permission data may define whether read operations are allowed or whether write operations are allowed. Also, the permission data may define region attributes which control the processing of the memory access at the memory 23, such as whether the operation is a strongly ordered type of memory access operation which must be handled in program order, or whether it is a normal operation which can be executed out of sequence with respect to the program order. While FIG. 12 shows an example where the end of the region is defined using a region limit address 174, it would also be possible to define the region limit using a region size parameter.

FIG. 13 shows an example of a translation table entry 180 of the ATU 120. Each entry includes a virtual page address 182 and a physical page address 184 into which the virtual page address 182 is to be translated. The entry 180 also includes a page size parameter 186 indicating the range of target addresses which fall within the page to which this translation is to be applied. For example, the page size may be selected from a limited set of options such as 4 kilobytes and 64 kilobytes. Therefore, the translation table entry in the ATU 120 may be limited to defining pages of predetermined sizes, in contrast to the MPU 38 which can define more arbitrary regions using the base address 172, and the limit address 174. When the ATU 120 performs a translation lookup for a given target address, the entry 180 is determined to correspond to the target address if a most significant portion of the target address matches the virtual page address 182 of the translation entry 180. The size of the portion to be matched to the virtual page address 182 depends on the page size 186. For example, for an address space defined using 32-bit addresses, the page address 182 would be the upper 20 bits of the address and the lower 12 bits would identify the different addresses within the same page ($2^{12}$=4096=4 kilobytes). Hence, the hit in the ATU 120 would occur if the upper 20 bits of a target address match the virtual page address 182 for one of the translation entries 180. If a hit is detected, then the virtual page address 182 of the target address is translated into the physical page address 184 of the corresponding translation entry 180. The remaining bits of the target address (the lower 12 bits in the example given above) specifying the page offset and remain the same following the translation.

The fault generating circuitry 122 of FIG. 11 generates a fault condition if multiple hit signals 155, 160 indicate a hit. However, sometimes it may be desirable to suppress the generation of a fault even if there is a hit. As shown in FIG. 14, an operating system may reserve a portion 190 of the address space for its own memory accesses. An application may also use addresses in a sub-portion 192 of the portion 190 reserved for the operating system. In this case, the MPU 170 for the region 192 would usually set the permissions 176 for application privilege level EL0 to indicate that reads and writes are not allowed for region 190, and set the permissions 178 for the operating system privilege level EL1 to indicate that reads and writes are allowed. In this case, accesses to region 190 by the application EL0 would not be possible, and if a fault is generated when both the ATU and MPU identify a matching entry for the target address, then the application could not be executed.

As shown in the lower portion of FIG. 14, to enable the application to be executed, accesses of privilege level EL0 to the sub region 192 can have their addresses translated to physical addresses using the ATU 120 so that it uses a different portion of the physical address space, avoiding the conflict with the portion 190 reserved for the operating system. The fault generating circuitry 122 can suppress generation of the fault condition when (a) there is a hit in the first MPU 38 for the target address; (b) there is also a hit in the ATU 120; (c) the memory access operation is of a predetermined privilege level (e.g. EL0); and (d) the first MPU 38 determines using the corresponding set of permission data that the memory access is not permitted. Hence, despite there being hits in both the first MPU 38 and the ATU 120, the access can proceed with the translated addresses.

The predetermined privilege level for which fault generation is suppressed may be the privilege level of the software which is to be relocated in the memory address space using the ATU 120 to avoid the conflict with other software. While FIG. 14 shows an example in which accesses from privilege level EL0 have their target address translated to avoid the conflict with privilege level EL1, in other examples this could be the other way round and it could be the accesses for EL1 which have their addresses translated and the accesses for EL0 remain in their original part of the address space. Also, to allow the memory access to proceed using the address translation when it is not permitted by MPU 38, the ATU 120 should perform the translation lookup irrespective of the result of the lookup in the first MPU 38 (unlike the feature described above where the ATU 120 could omit the translation lookup if the MPU 38 determines that a memory access is not allowed).

The coprocessor 50 is used to program the first MPU 38 and ATU 120. Previous MPUs have been programmed by software using a legacy interface 196 illustrated in FIG. 15. The coprocessor 50 may have update storage locations for storing a region selector 200, a region base address 202, a region limit address 204, a set of access permissions 206 for privilege level EL0 and a set of access permissions 208 for privilege level EL1. The storage locations may be registers or sub-portions of registers for example. To update a set of permission data in the first MPU 38, software executed by the processing circuitry 22 writes to the region selector storage location 200 an identifier of the permission data to be updated, and writes the required values of the base address, limit address, and permissions to the other storage locations 202, 204, 206, 208. If more than one set of permission data needs to be updated in the first MPU 38, then these are updated sequentially with each update being separated by a barrier operation to ensure that the data written to storage locations 200-208 has been read by the first MPU 38 before data for a following update is written to locations 200-208. This can cause delays in updating the memory protection data, which may be undesirable in a real time operating system.

To address this issue, the present technique provides an update interface 210 as shown in FIG. 16. Instead of providing one set of locations 200-208 for updating a single MPU entry at a time, the interface 210 shown in FIG. 16 includes multiple sets 212 of update storage locations. To update a given set of permission data, the software executed by the processing circuitry 22 writes the updated data to the set 212 of update storage locations corresponding to the set of permission data which needs to be updated. This avoids the need for separating the updating of different MPU entries using barrier operations, speeding up the updating.

Although the main interface 210 shown in FIG. 16 is more appropriate for a real time system, if legacy software which has been designed for the legacy interface of FIG. 15 is to be executed by the system, then both interfaces may be provided in the coprocessor 15 to allow both new and legacy software to update the first MPU 38.

FIG. 17 illustrates a method of handling memory access operations using the first MPU 38 and ATU 120. At step 300 a memory access operation is triggered by the processing circuitry 22 which specifies a target address A. At step 302 the first MPU 38 performs a protection lookup to search for sets of permission data corresponding to a region including the target address A. At step 304 the first MPU 38 determines whether there has been a protection hit for any region x (i.e. the target address is within the region defined by MPU entry x). If there is a hit, then at step 306 the first MPU 38 sets the protection hit signal for region x to 1. If there is no hit, then at step 308 the first MPU 38 sets the protection hit signal corresponding to region x to 0. Steps 304-308 are repeated for each region defined in the first MPU 38.

Concurrently with the operation of the first MPU 38, the address translation unit 120 performs a translation lookup at step 310 for checking whether there is a corresponding translation table entry for the target address A. At step 312, the ATU 120 determines whether there has been a hit in any translation entry y. If there is a translation hit for translation entry y then at step 314 the translation hit signal corresponding to entry y is set to 1 while if there is no hit then the translation hit signal y is set to 0 at step 360. Again, steps 312-316 are repeated for each translation entry of the ATU 120.

If there has been a hit in the first MPU 38, then following step 306 the method proceeds to step 320 where the first MPU 38 determines whether the memory access is permitted using the set of permissions defined for the current exception level in the entry which matched the target address. If the access is permitted, then the pass signal 150 is set to 1 at step 322 while if the access is not permitted then the pass signal set to 0 at step 324. The pass signal 150 is supplied to the second MPU 40. If the pass signal 150 is equal to 1, then the second MPU determines at step 326 whether the access complies with its access permissions. If the second MPU determines that the access is permitted then at step 328 the access is sent the memory to be processed. On the other hand if either the first MPU 38 or the second MPU 40 determines that the access is not permitted then a fault handling is performed at step 330 or 332 (step 330 corresponding to operating system permission fault handling and step 332 corresponding to hypervisor permission fault handling).

If the target address has matched an entry in the translation unit, then following step 314 the method proceeds to step 340 where the target address A is translated from the virtual address VA to a physical address PA according to the translation entry of the ATU 120. At step 342 the translated physical address is passed to the second MPU 40 which then checks whether access is permitted at step 344. Steps 344, 346, 348 are the same as steps 326, 328, 332 described above. The access permission checking of the second MPU 40 is the same regardless whether the target address hits in the first MPU or the ATU 120.

Meanwhile, following the protection lookup and translation lookup operations from step 302 to 316, at step 350 the fault generating circuitry 122 determines whether (a) multiple hit signals 155, 160 are equal to 1; or (b) none of the hit signals 155, 160 are equal to 1. If the system has been programmed correctly than a single hit signal will equal 1 and the other hit signals 155, 160 will equal 0. In this case, at step 352 no fault condition is triggered by the fault generating circuitry 122.

However, if zero, two or more hits have been triggered than at step 354 the fault generating circuitry 122 detects whether the following combination of events has occurred: (i) the memory access is from a predetermined privilege level (in this example, EL0); (ii) there was a hit in the ATU 120; and (iii) the pass signal 150 received from the first MPU 38 indicates that the access is not permitted. If this is the case then at step 352 no fault condition is triggered because the memory access is allowed to continue based on the translation provided by ATU 120 (this is the situation shown in FIG. 14). On the other hand, if at step 354 this combination of events is not detected then at step 356 a fault condition is generated. The fault may be the same for all types of errors or alternatively the fault generating circuitry 122 may generate different kinds of faults depending on whether there has been multiple hits in the MPU, multiple hits in the ATU, a hit in each of the MPU and ATU, or zero hits in the MPU and ATU. At step 358 the system executes fault handling software for dealing with the fault. For example, the system may activate a warning light to inform the user that there is a problem, may suspend processing of the memory access request which triggered the fault or may provide some other means of addressing the potential unsafe situation caused by the multiple hits.

FIG. 18 shows another example in which the first MPU 38 has a corresponding memory protection cache (micro-MPU) 400 and the ATU 120 has a corresponding address translation cache (micro-ATU) 410. The micro-MPU 400 stores a subset of the sets of permission data of the first MPU 38. The micro-ATU 410 stores a subset of the address translation entries of the ATU 120. In response to a memory access operation, the target address is supplied to each of the first MPU 38, micro-MPU 400, ATU 120 and micro-ATU 410.

If the micro-MPU 400 stores a set of permission data corresponding to a region including the target address, then the access permissions for the memory access are controlled using this set of permission data, and a full lookup of the first MPU 38 can be omitted. If the micro-MPU 400 does not store the corresponding set of permission data, then a full lookup of the first MPU 38 is performed and, if there is a hit in the first MPU 38, then the memory access is handled using the obtained set of permission data, which can also be placed in the micro-MPU 400 so that subsequent accesses to the same region of memory can be handled more quickly. As the micro-MPU 400 stores fewer sets of permission data than the first MPU 38, a lookup of the micro-MPU 400 is quicker and more energy efficient than a lookup of the first MPU 38.

Similarly, if the micro-ATU 410 stores an address translation entry corresponding a page including the target address, then the target address is translated from a virtual address to a physical address using the obtained address translation entry, and a full lookup of the ATU 120 is omitted. On the other hand, if the micro-ATU 120 does not store the corresponding entry, then a full lookup of the ATU 120 is performed and, if there is a hit, the target address is translated using the entry obtained in the ATU 120. The micro-ATU 410 can then be updated with the entry obtained from the ATU 120.

In a similar way to the hit signals 155, 160 generated by the first MPU 38 and ATU 120, the micro-MPU 400 and micro-ATU 410 also generate corresponding hit signals 420, 430 indicating whether data corresponding to the target address has been identified. As before, the fault generating circuitry 122 generates a fault if no hit signals 155, 160, 420, 430 indicate a hit, or if multiple hit signals 155, 160, 420, 430 indicate a hit (unless the situation described with respect to FIG. 14 and step 354 of FIG. 17 has occurred).

Any kind of cache linefill and eviction scheme may be used for controlling which data is placed in the micro-MPU 400 or micro-ATU 410. While this example shows a two-level MPU and two-level ATU, in other examples further levels of cache may be provided. Also, it is not essential for the number of MPU cache levels to be the same as the number of ATU cache levels.

FIG. 19 shows another example in which a selection unit 450 is provided for selecting which of the first MPU 38 and ATU 120 should handle a particular memory access. The selection unit 450 may store a set of selection entries defining some memory ranges 130 for which the first MPU 38 should be used and other memory ranges 132 for which the ATU 120 should be used (effectively dividing the address space in a similar way to the example of FIG. 9). The selection unit 450 passes an MPU selection signal to the first MPU 38 and an ATU selection signal 470 to the ATU 120 indicating whether each unit is selected for handling the memory access. As the selection unit 450 selects only one of the first MPU 38 and ATU 120, the fault generating circuitry 122 may not be necessary in this embodiment as it is not possible for both the MPU 38 and ATU 120 to be active for a given memory access. However, if it is desired to generate a fault if there are hits in multiple entries of the first MPU 38 or multiple entries of the ATU 120, then the fault generating circuitry 122 could still be provided.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
processing circuitry configured to perform memory access operations for accessing data from a memory;
a memory protection unit configured to store sets of permission data for defining access permissions for corresponding regions of a memory address space; and
an address translation unit configured to store address translation entries for defining virtual-to-physical address mappings for corresponding pages of the memory address space; wherein:
when operating in a mode in which both said memory protection unit and said address translation unit are active concurrently for handling memory access operations triggered by the same processing circuitry, in response to a memory access operation from said processing circuitry specifying a target address, said data processing apparatus is configured to select, in dependence on a numeric value of said target address, which of said memory protection unit and said address translation unit to use for handling said memory access operation;
if said memory protection unit is selected for handling said memory access operation, then said memory protection unit is configured to determine whether said memory access operation is permitted using a corresponding set of permission data corresponding to a region including said target address, and if said memory access operation is permitted, to allow further processing of said memory access operation using said target address as a physical address; and
if said address translation unit is selected for handling said memory access operation, then said address translation unit is configured to translate said target address from a virtual address to a physical address for said memory access operation using a corresponding address translation entry corresponding to a page including said target address.

2. The data processing apparatus according to claim 1, wherein said address translation entries of said address translation unit are programmable by software executed by said processing circuitry.

3. The data processing apparatus according to claim 1, comprising a selection unit configured to select, in dependence on said target address, which of said memory protection unit and said address translation unit to use for handling said memory access operation.

4. The data processing apparatus according to claim 1, wherein in response to said memory access operation, said memory protection unit is configured to perform a protection lookup to determine whether said memory protection unit stores said corresponding set of permission data, and said address translation unit is configured to perform a translation lookup to determine whether said address translation unit stores said corresponding address translation entry;
if said protection lookup determines that said memory protection unit stores said corresponding set of permission data, then said memory protection unit is selected for handling said memory access operation; and
if said translation lookup determines that said address translation unit stores said corresponding address translation entry, then said address translation unit is selected for handling said memory access operation.

5. The data processing apparatus according to claim 4, comprising a memory protection cache for storing a subset of said sets of permission data;
wherein in response to said memory access operation, if said memory protection cache stores said corresponding set of permission data then said memory protection unit is selected for handling said memory access operation without performing said protection lookup.

6. The data processing apparatus according to claim 4, comprising an address translation cache for storing a subset of said address translation entries;
wherein in response to said memory access operation, if said address translation cache stores said corresponding address translation entry then said address translation unit is selected for handling said memory access operation without performing said translation lookup.

7. The data processing apparatus according to claim 4, wherein said protection lookup and said translation lookup are performed in parallel by said memory protection unit and said address translation unit.

8. The data processing apparatus according to claim 4, wherein said address translation unit is configured to perform said translation lookup after said memory protection unit has performed said protection lookup.

9. The data processing apparatus according to claim 8, wherein said address translation unit is configured to omit performing said translation lookup if said memory protection unit determines from said corresponding set of permission data that said memory access operation is not permitted.

10. The data processing apparatus according to claim 4, comprising fault generating circuitry configured to generate a fault condition if said protection lookup determines that said memory protection unit stores said corresponding set of permission data and said translation lookup determines that said address translation unit stores said corresponding address translation entry.

11. The data processing apparatus according to claim 10, wherein in response to said memory access operation, said memory protection unit is configured to generate a memory protection hit signal indicating whether said memory protection unit stores said corresponding set of permission data;
in response to said memory access operation, said address translation unit is configured to generate an address translation hit signal indicating whether said address translation unit stores said corresponding address translation entry; and
said fault generating circuitry is configured to generate said fault condition if said memory protection hit signal indicates that said memory protection unit stores said corresponding set of permission data and said address translation hit signal indicates that said memory protection unit stores said corresponding address translation entry.

12. The data processing apparatus according to claim 10, wherein said fault generating circuitry is configured to suppress generation of said fault condition if said memory protection unit determines, using said corresponding set of permission data, that said memory access operation is not permitted.

13. The data processing apparatus according to claim 10, wherein said sets of permission data define separate access permissions for memory access operations of a first privilege level and a second privilege level; and
said fault generating circuitry is configured to suppress generation of said fault condition if, in response to a memory access operation of said first privilege level, said memory protection unit determines, using said corresponding set of permission data, that said memory access request is not permitted.

14. The data processing apparatus according claim 4, comprising fault generating circuitry configured to generate a fault condition if, in response to said memory access request, said protection lookup determines that said target address corresponds to multiple sets of permission data corresponding to overlapping regions of said memory address space.

15. The data processing apparatus according to claim 14, wherein in response to said memory access operation, said memory protection unit is configured to generate a plurality of memory protection hit signals, each memory protection hit signal indicating whether an associated set of permission data corresponds to said target address; and
said fault generating circuitry is configured to generate said fault condition if more than one of said plurality of memory protection hit signals generated in response to said memory access operation indicate that said associated set of permission data corresponds to said target address.

16. The data processing apparatus according to claim 1, comprising a first memory protection interface comprising a plurality of sets of update storage locations, each set of update storage locations corresponding to one of said sets of permission data;
wherein said memory protection unit is configured to update a selected set of permission data in response to software executed by said processing circuitry writing updated permission data to the set of update storage locations of said first memory protection interface corresponding to said selected set of permission data.

17. The data processing apparatus according to claim 16, further comprising a second memory protection interface comprising an identifier storage location and a set of update storage locations;
wherein said memory protection unit is configured to update a selected set of permission data in response to software executed by said processing circuitry writing an identifier of said selected set of permission data to said identifier storage location and writing updated permission data to said set of update storage locations.

18. The data processing apparatus according to claim 1, comprising a further memory protection unit configured to store sets of further permission data for defining further memory access permissions for corresponding regions of said memory address space.

19. The data processing apparatus according to claim 1, wherein if said memory protection unit is selected for handling said memory access operation, then said memory access operation is permitted only if both said memory protection unit and said further memory protection unit determine that said memory access operation is permitted.

20. The data processing apparatus according to claim 18, wherein if said address translation unit is selected for handling said memory access operation, then said further memory protection unit is configured to control whether said memory access operation is permitted using a set of further permission data corresponding to a region corresponding to said physical address obtained by said address translation unit by translating said target address.

21. A data processing apparatus comprising:
processing means for performing memory access operations for accessing data from a memory means for storing data;
memory protection means for storing sets of permission data for defining access permissions for corresponding regions of a memory address space; and
address translation means for storing address translation entries for defining virtual-to-physical address mappings for corresponding pages of the memory address space; wherein:
when operating in a mode in which both said memory protection means and said address translation means are active concurrently for handling memory access operations triggered by the same processing means, in response to a memory access operation from said processing means specifying a target address, said data processing apparatus is configured to select, in dependence on a numeric value of said target address, which of said memory protection means and said address translation means to use for handling said memory access operation;
if said memory protection means is selected for handling said memory access operation, then said memory protection means is configured to determine whether said memory access operation is permitted using a corresponding set of permission data corresponding to a region including said target address, and if said memory access operation is permitted, to allow further processing of said memory access operation using said target address as a physical address; and if said address translation means is selected for handling said memory access operation, then said address translation means is configured to translate said target address from a virtual address to a physical address for said memory access operation using a corresponding address translation entry corresponding to a page including said target address.

22. A data processing method comprising:

performing memory access operations for accessing data from a memory;

storing in a memory protection unit sets of permission data for defining access permissions for corresponding regions of a memory address space; and storing in an address translation unit address translation entries for defining virtual-to-physical address mappings for corresponding pages of the memory address space;

when operating in a mode in which both said memory protection unit and said address translation unit are active concurrently for handling memory access operations triggered by the same processing circuitry, in response to a memory access operation from said processing circuitry specifying a target address, selecting in dependence on a numeric value of said target address which of said memory protection unit and said address translation unit to use for handling said memory access operation;

if said memory protection unit is selected for handling said memory access operation, determining whether said memory access operation is permitted using a corresponding set of permission data corresponding to a region including said target address, and if said memory access operation is permitted, allowing further processing of said memory access operation using said target address as a physical address; and if said address translation unit is selected for handling said memory access operation, translating said target address from a virtual address to a physical address for said memory access operation using a corresponding address translation entry corresponding to a page including said target address.

* * * * *